(12) United States Patent
Wu et al.

(10) Patent No.: US 8,189,666 B2
(45) Date of Patent: May 29, 2012

(54) LOCAL PICTURE IDENTIFIER AND COMPUTATION OF CO-LOCATED INFORMATION

(75) Inventors: Yongjun Wu, Redmond, WA (US); Naveen Thumpudi, Sammamish, WA (US); Kim-chyan Gan, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 725 days.

(21) Appl. No.: 12/364,325

(22) Filed: Feb. 2, 2009

(65) Prior Publication Data
US 2010/0195721 A1     Aug. 5, 2010

(51) Int. Cl.
*H04N 7/36*      (2006.01)
*H04N 11/02*     (2006.01)

(52) U.S. Cl. .................................. 375/240.12
(58) Field of Classification Search .............. 375/240.12
See application file for complete search history.

(56) References Cited

U.S. PATENT DOCUMENTS

| | | |
|---|---|---|
| 4,051,470 A | 9/1977 | Esteban et al. |
| 4,454,546 A | 6/1984 | Mori |
| 4,493,091 A | 1/1985 | Gundry |
| 4,661,849 A | 4/1987 | Hinman |
| 4,661,853 A | 4/1987 | Roeder et al. |
| 4,695,882 A | 9/1987 | Wada et al. |
| 4,706,260 A | 11/1987 | Fedele et al. |
| 4,796,087 A | 1/1989 | Guichard et al. |
| 4,849,812 A | 7/1989 | Borgers et al. |
| 4,862,267 A | 8/1989 | Gillard et al. |
| 4,864,393 A | 9/1989 | Harradine et al. |
| 4,937,036 A | 6/1990 | Beard et al. |
| 4,954,892 A | 9/1990 | Asai et al. |
| 5,021,879 A | 6/1991 | Vogel |
| 5,043,919 A | 8/1991 | Callaway et al. |
| 5,068,724 A | 11/1991 | Krause et al. |
| 5,089,887 A | 2/1992 | Robert et al. |
| 5,089,889 A | 2/1992 | Sugiyama |
| 5,091,782 A | 2/1992 | Krause et al. |
| 5,103,306 A | 4/1992 | Weiman et al. |
| 5,111,292 A | 5/1992 | Kuriacose et al. |
| 5,117,287 A | 5/1992 | Koike et al. |
| 5,132,792 A | 7/1992 | Yonemitsu et al. |

(Continued)

FOREIGN PATENT DOCUMENTS

EP      0 279 053      8/1988

(Continued)

OTHER PUBLICATIONS

Ji, Xiangyang et al. "New Bi-Prediction Techniques for B Pictures Coding", 2004.*

(Continued)

*Primary Examiner* — Michael Simitoski
(74) *Attorney, Agent, or Firm* — Klarquist Sparkman, LLP

(57) ABSTRACT

Video decoding innovations for using local picture identifiers and computing co-located information are described. In one aspect, a decoder identifies reference pictures in a reference picture list of a temporal direct prediction mode macroblock that match reference pictures used by a co-located macroblock using local picture identifiers. In another aspect, a decoder determines whether reference pictures used by blocks are the same by comparing local picture identifiers during calculation of boundary strength. In yet another aspect, a decoder determines a picture type of a picture and based on the picture type selectively skips or simplifies computation of co-located information for use in reconstructing direct prediction mode macroblocks outside the picture.

17 Claims, 5 Drawing Sheets

U.S. PATENT DOCUMENTS

| | | |
|---|---|---|
| 5,157,490 A | 10/1992 | Kawai et al. |
| 5,175,618 A | 12/1992 | Ueda |
| 5,185,819 A | 2/1993 | Ng et al. |
| 5,193,004 A | 3/1993 | Wang et al. |
| 5,223,949 A | 6/1993 | Honjo |
| 5,227,878 A | 7/1993 | Puri et al. |
| 5,235,618 A | 8/1993 | Sakai et al. |
| 5,258,836 A | 11/1993 | Murata |
| 5,260,782 A | 11/1993 | Hui |
| 5,266,941 A | 11/1993 | Akeley et al. |
| 5,287,420 A | 2/1994 | Barrett |
| 5,298,991 A | 3/1994 | Yagasaki et al. |
| 5,317,397 A | 5/1994 | Odaka et al. |
| 5,317,672 A | 5/1994 | Crossman et al. |
| 5,335,299 A | 8/1994 | Atkinson |
| 5,343,248 A | 8/1994 | Fujinami |
| 5,347,308 A | 9/1994 | Wai |
| 5,394,170 A | 2/1995 | Akeley et al. |
| 5,400,075 A | 3/1995 | Savatier |
| 5,400,371 A | 3/1995 | Natarajan |
| 5,412,430 A | 5/1995 | Nagata |
| 5,412,435 A | 5/1995 | Nakajima |
| 5,414,796 A | 5/1995 | Jacobs et al. |
| RE34,965 E | 6/1995 | Sugiyama |
| 5,422,676 A | 6/1995 | Herpel et al. |
| 5,424,779 A | 6/1995 | Odaka et al. |
| 5,428,396 A | 6/1995 | Yagasaki et al. |
| 5,442,400 A | 8/1995 | Sun |
| 5,448,297 A | 9/1995 | Alattar et al. |
| 5,453,799 A | 9/1995 | Yang et al. |
| 5,457,495 A | 10/1995 | Hartung |
| 5,461,421 A | 10/1995 | Moon |
| RE35,093 E | 11/1995 | Wang et al. |
| 5,467,086 A | 11/1995 | Jeong |
| 5,467,134 A | 11/1995 | Laney et al. |
| 5,467,136 A | 11/1995 | Odaka |
| 5,477,272 A | 12/1995 | Zhang et al. |
| RE35,158 E | 2/1996 | Sugiyama |
| 5,510,840 A | 4/1996 | Yonemitsu et al. |
| 5,539,466 A | 7/1996 | Igarashi et al. |
| 5,565,922 A | 10/1996 | Krause |
| 5,579,430 A | 11/1996 | Grill et al. |
| 5,586,200 A | 12/1996 | Devaney et al. |
| 5,594,504 A | 1/1997 | Ebrahimi |
| 5,598,215 A | 1/1997 | Watanabe |
| 5,598,216 A | 1/1997 | Lee |
| 5,617,144 A | 4/1997 | Lee |
| 5,619,281 A | 4/1997 | Jung |
| 5,621,481 A | 4/1997 | Yasuda et al. |
| 5,623,311 A | 4/1997 | Phillips et al. |
| 5,623,424 A | 4/1997 | Azadegan et al. |
| 5,648,819 A | 7/1997 | Tranchard |
| 5,661,755 A | 8/1997 | Van De Kerkhof et al. |
| 5,666,461 A | 9/1997 | Igarashi et al. |
| 5,677,735 A | 10/1997 | Ueno et al. |
| 5,678,002 A | 10/1997 | Fawcett et al. |
| 5,686,964 A | 11/1997 | Tabatabai et al. |
| 5,687,097 A | 11/1997 | Mizusawa et al. |
| 5,691,771 A | 11/1997 | Oishi et al. |
| 5,699,476 A | 12/1997 | Van Der Meer |
| 5,701,164 A | 12/1997 | Kato |
| 5,717,441 A | 2/1998 | Serizawa et al. |
| 5,724,453 A | 3/1998 | Ratnakar et al. |
| 5,731,850 A | 3/1998 | Maturi et al. |
| 5,734,755 A | 3/1998 | Ramchandran et al. |
| 5,742,735 A | 4/1998 | Eberlein et al. |
| 5,745,738 A | 4/1998 | Ricard |
| 5,748,784 A | 5/1998 | Sugiyama |
| 5,764,807 A | 6/1998 | Pearlman |
| 5,764,814 A | 6/1998 | Chen et al. |
| 5,767,898 A | 6/1998 | Urano et al. |
| 5,786,860 A | 7/1998 | Kim et al. |
| 5,787,203 A | 7/1998 | Lee et al. |
| 5,796,438 A | 8/1998 | Hosono |
| 5,798,788 A | 8/1998 | Meehan et al. |
| 5,799,113 A | 8/1998 | Lee |
| RE35,910 E | 9/1998 | Nagata et al. |
| 5,819,215 A | 10/1998 | Dobson et al. |
| 5,822,541 A | 10/1998 | Nonomura et al. |
| 5,825,310 A | 10/1998 | Tsutsui |
| 5,825,830 A | 10/1998 | Kopf |
| 5,831,559 A | 11/1998 | Agarwal et al. |
| 5,835,144 A | 11/1998 | Matsumura et al. |
| 5,835,149 A | 11/1998 | Astle |
| 5,844,613 A | 12/1998 | Chaddha |
| 5,845,243 A | 12/1998 | Smart et al. |
| 5,847,776 A | 12/1998 | Khmelnitsky |
| 5,874,995 A | 2/1999 | Naimpally et al. |
| 5,901,248 A | 5/1999 | Fandrianto et al. |
| 5,923,375 A | 7/1999 | Pau |
| 5,926,226 A | 7/1999 | Proctor et al. |
| 5,926,573 A | 7/1999 | Kim et al. |
| 5,929,940 A | 7/1999 | Jeannin |
| 5,933,451 A | 8/1999 | Ozkan et al. |
| 5,946,042 A | 8/1999 | Kato |
| 5,946,043 A | 8/1999 | Lee et al. |
| 5,946,419 A | 8/1999 | Chen et al. |
| 5,949,489 A | 9/1999 | Nishikawa et al. |
| 5,952,943 A | 9/1999 | Walsh et al. |
| 5,959,673 A | 9/1999 | Lee et al. |
| 5,963,258 A | 10/1999 | Nishikawa et al. |
| 5,963,673 A | 10/1999 | Kodama et al. |
| 5,970,173 A | 10/1999 | Lee et al. |
| 5,970,175 A | 10/1999 | Nishikawa et al. |
| 5,973,743 A | 10/1999 | Han |
| 5,973,755 A | 10/1999 | Gabriel |
| 5,974,184 A | 10/1999 | Eifrig |
| 5,982,438 A | 11/1999 | Lin et al. |
| 5,990,960 A | 11/1999 | Murakami et al. |
| 5,991,447 A | 11/1999 | Eifrig et al. |
| 5,995,151 A | 11/1999 | Naveen et al. |
| 6,002,439 A | 12/1999 | Murakami et al. |
| 6,005,980 A | 12/1999 | Eifrig et al. |
| RE36,507 E | 1/2000 | Iu |
| 6,011,596 A | 1/2000 | Burl |
| 6,026,195 A | 2/2000 | Eifrig et al. |
| 6,029,126 A | 2/2000 | Malvar |
| 6,040,863 A | 3/2000 | Kato |
| 6,049,630 A | 4/2000 | Wang et al. |
| 6,052,150 A | 4/2000 | Kikuchi |
| 6,055,012 A | 4/2000 | Haskell et al. |
| 6,058,362 A | 5/2000 | Malvar |
| 6,067,322 A | 5/2000 | Wang |
| 6,072,831 A | 6/2000 | Chen |
| 6,081,209 A | 6/2000 | Schuyler et al. |
| 6,094,225 A | 7/2000 | Han |
| RE36,822 E | 8/2000 | Sugiyama |
| 6,097,759 A | 8/2000 | Murakami et al. |
| 6,111,914 A | 8/2000 | Bist |
| 6,115,689 A | 9/2000 | Malvar |
| 6,125,147 A | 9/2000 | Florencio et al. |
| 6,130,963 A | 10/2000 | Uz et al. |
| 6,154,495 A | 11/2000 | Yamaguchi et al. |
| 6,160,846 A | 12/2000 | Chiang et al. |
| 6,167,090 A | 12/2000 | Iizuka |
| 6,175,592 B1 | 1/2001 | Kim et al. |
| 6,182,034 B1 | 1/2001 | Malvar |
| 6,188,725 B1 | 2/2001 | Sugiyama |
| 6,188,794 B1 | 2/2001 | Nishikawa et al. |
| 6,192,081 B1 | 2/2001 | Chiang et al. |
| 6,201,927 B1 | 3/2001 | Comer |
| 6,205,176 B1 | 3/2001 | Sugiyama |
| 6,205,177 B1 | 3/2001 | Girod et al. |
| 6,208,761 B1 | 3/2001 | Passaggio et al. |
| 6,212,232 B1 | 4/2001 | Reed et al. |
| 6,226,407 B1 | 5/2001 | Zabih et al. |
| 6,240,380 B1 | 5/2001 | Malvar |
| RE37,222 E | 6/2001 | Yonemitsu et al. |
| 6,243,418 B1 | 6/2001 | Kim |
| 6,243,497 B1 | 6/2001 | Chiang et al. |
| 6,259,810 B1 | 7/2001 | Gill et al. |
| 6,263,024 B1 | 7/2001 | Matsumoto |
| 6,263,065 B1 | 7/2001 | Durinovic-Johri et al. |
| 6,269,121 B1 | 7/2001 | Kwak |
| 6,271,885 B2 | 8/2001 | Sugiyama |
| 6,275,531 B1 | 8/2001 | Li |
| 6,278,735 B1 | 8/2001 | Mohsenian |

| | | | |
|---|---|---|---|
| 6,282,243 B1 | 8/2001 | Kazui et al. | |
| 6,292,585 B1 | 9/2001 | Yamaguchi et al. | |
| 6,295,376 B1 | 9/2001 | Nakaya | |
| 6,304,928 B1 | 10/2001 | Mairs et al. | |
| 6,307,887 B1 | 10/2001 | Gabriel | |
| 6,307,973 B2 | 10/2001 | Nishikawa et al. | |
| 6,320,593 B1 | 11/2001 | Sobel et al. | |
| 6,324,216 B1 | 11/2001 | Igarashi et al. | |
| 6,332,003 B1 | 12/2001 | Matsuura | |
| 6,337,881 B1 | 1/2002 | Chaddha | |
| 6,370,502 B1 | 4/2002 | Wu et al. | |
| 6,377,628 B1 | 4/2002 | Schultz et al. | |
| 6,381,279 B1 | 4/2002 | Taubman | |
| 6,404,813 B1 | 6/2002 | Haskell et al. | |
| 6,421,738 B1 | 7/2002 | Ratan et al. | |
| 6,427,027 B1 | 7/2002 | Suzuki et al. | |
| 6,459,812 B2 | 10/2002 | Suzuki et al. | |
| 6,473,409 B1 | 10/2002 | Malvar | |
| 6,483,874 B1 | 11/2002 | Panusopone et al. | |
| 6,496,601 B1 | 12/2002 | Migdal et al. | |
| 6,519,287 B1 | 2/2003 | Hawkins et al. | |
| 6,522,693 B1 | 2/2003 | Lu et al. | |
| 6,529,632 B1 | 3/2003 | Nakaya et al. | |
| 6,539,056 B1 | 3/2003 | Sato et al. | |
| 6,563,953 B2 | 5/2003 | Lin et al. | |
| 6,573,905 B1 | 6/2003 | MacInnis et al. | |
| 6,573,915 B1 | 6/2003 | Sivan et al. | |
| 6,574,593 B1 | 6/2003 | Gao et al. | |
| 6,614,442 B1 | 9/2003 | Ouyang et al. | |
| 6,636,565 B1 | 10/2003 | Kim | |
| 6,647,061 B1 | 11/2003 | Panusopone et al. | |
| 6,650,781 B2 | 11/2003 | Nakaya | |
| 6,654,417 B1 | 11/2003 | Hui | |
| 6,654,419 B1 | 11/2003 | Sriram et al. | |
| 6,654,420 B1 | 11/2003 | Snook | |
| 6,683,987 B1 | 1/2004 | Sugahara | |
| 6,704,360 B2 | 3/2004 | Haskell et al. | |
| 6,728,317 B1 | 4/2004 | Demos | |
| 6,735,345 B2 | 5/2004 | Lin et al. | |
| 6,765,963 B2 | 7/2004 | Karczewicz et al. | |
| RE38,563 E | 8/2004 | Eifrig et al. | |
| 6,785,331 B1 | 8/2004 | Jozawa et al. | |
| 6,795,584 B2 | 9/2004 | Karczewicz et al. | |
| 6,798,364 B2 | 9/2004 | Chen et al. | |
| 6,798,837 B1 | 9/2004 | Uenoyama et al. | |
| 6,807,231 B1 | 10/2004 | Wiegand et al. | |
| 6,810,083 B2 | 10/2004 | Chen et al. | |
| 6,816,552 B2 | 11/2004 | Demos | |
| 6,819,714 B2 | 11/2004 | Yamada et al. | |
| 6,862,402 B2 | 3/2005 | Kim | |
| 6,873,657 B2 | 3/2005 | Yang et al. | |
| 6,876,703 B2 | 4/2005 | Ismaeil et al. | |
| 6,895,050 B2 | 5/2005 | Lee | |
| 6,900,846 B2 | 5/2005 | Lee et al. | |
| 6,920,175 B2 | 7/2005 | Karczewicz et al. | |
| 6,975,680 B2 | 12/2005 | Demos | |
| 6,980,596 B2 | 12/2005 | Wang et al. | |
| 6,999,513 B2 | 2/2006 | Sohn et al. | |
| 7,003,035 B2 | 2/2006 | Tourapis et al. | |
| 7,054,494 B2 | 5/2006 | Lin et al. | |
| 7,092,576 B2 | 8/2006 | Srinivasan et al. | |
| 7,154,952 B2 | 12/2006 | Tourapis et al. | |
| 7,233,621 B2 | 6/2007 | Jeon | |
| 7,317,839 B2 | 1/2008 | Holcomb | |
| 7,346,111 B2 | 3/2008 | Wingerm | |
| 7,362,807 B2 | 4/2008 | Kondo et al. | |
| 7,567,617 B2 | 7/2009 | Holcomb | |
| 7,733,960 B2 | 6/2010 | Kondo et al. | |
| 2001/0019586 A1 | 9/2001 | Kang et al. | |
| 2001/0040926 A1 | 11/2001 | Hannuksela et al. | |
| 2002/0012394 A1 | 1/2002 | Hatano et al. | |
| 2002/0105596 A1 | 8/2002 | Selby | |
| 2002/0114388 A1 | 8/2002 | Ueda | |
| 2002/0122488 A1 | 9/2002 | Takahashi et al. | |
| 2002/0143556 A1 | 10/2002 | Kadatch | |
| 2002/0154693 A1 | 10/2002 | Demos | |
| 2002/0168066 A1 | 11/2002 | Li | |
| 2002/0176624 A1 | 11/2002 | Kostrzewski et al. | |
| 2002/0186890 A1 | 12/2002 | Lee et al. | |
| 2003/0053537 A1 | 3/2003 | Kim et al. | |
| 2003/0099292 A1 | 5/2003 | Wang et al. | |
| 2003/0099294 A1 | 5/2003 | Wang et al. | |
| 2003/0110236 A1 | 6/2003 | Yang et al. | |
| 2003/0112864 A1 | 6/2003 | Karczewicz et al. | |
| 2003/0113026 A1 | 6/2003 | Srinivasan et al. | |
| 2003/0115041 A1 | 6/2003 | Chen | |
| 2003/0115042 A1 | 6/2003 | Chen | |
| 2003/0115050 A1 | 6/2003 | Chen | |
| 2003/0115051 A1 | 6/2003 | Chen | |
| 2003/0115052 A1 | 6/2003 | Chen | |
| 2003/0125932 A1 | 7/2003 | Wang et al. | |
| 2003/0142748 A1 | 7/2003 | Tourapis | |
| 2003/0142751 A1 | 7/2003 | Hannuksela | |
| 2003/0152146 A1 | 8/2003 | Lin et al. | |
| 2003/0156643 A1 | 8/2003 | Song | |
| 2003/0156646 A1 | 8/2003 | Hsu et al. | |
| 2003/0202590 A1 | 10/2003 | Gu et al. | |
| 2003/0206589 A1 | 11/2003 | Jeon | |
| 2004/0001546 A1 | 1/2004 | Tourapis et al. | |
| 2004/0008899 A1 | 1/2004 | Tourapis et al. | |
| 2004/0042549 A1 | 3/2004 | Huang et al. | |
| 2004/0047418 A1 | 3/2004 | Tourapis et al. | |
| 2004/0136457 A1 | 7/2004 | Funnell et al. | |
| 2004/0139462 A1 | 7/2004 | Hannuksela et al. | |
| 2004/0141651 A1 | 7/2004 | Hara et al. | |
| 2004/0146109 A1 | 7/2004 | Kondo et al. | |
| 2004/0228413 A1 | 11/2004 | Hannuksela | |
| 2004/0234143 A1* | 11/2004 | Hagai et al. | 382/238 |
| 2005/0013497 A1 | 1/2005 | Hsu et al. | |
| 2005/0013498 A1 | 1/2005 | Srinivasan et al. | |
| 2005/0015528 A1 | 1/2005 | Du | |
| 2005/0036759 A1 | 2/2005 | Lin et al. | |
| 2005/0053137 A1 | 3/2005 | Holcomb | |
| 2005/0053147 A1 | 3/2005 | Mukerjee et al. | |
| 2005/0053149 A1 | 3/2005 | Mukerjee et al. | |
| 2005/0053156 A1 | 3/2005 | Lin et al. | |
| 2005/0084166 A1 | 4/2005 | Boneh et al. | |
| 2005/0100093 A1 | 5/2005 | Holcomb | |
| 2005/0129120 A1 | 6/2005 | Jeon | |
| 2005/0135484 A1 | 6/2005 | Lee | |
| 2005/0147167 A1 | 7/2005 | Dumitras et al. | |
| 2005/0185713 A1* | 8/2005 | Winger et al. | 375/240.12 |
| 2005/0207490 A1* | 9/2005 | Wang et al. | 375/240.15 |
| 2005/0254584 A1 | 11/2005 | Kim et al. | |
| 2006/0013307 A1 | 1/2006 | Olivier et al. | |
| 2006/0072662 A1 | 4/2006 | Tourapis et al. | |
| 2006/0280253 A1 | 12/2006 | Tourapis et al. | |
| 2007/0064801 A1 | 3/2007 | Wang et al. | |
| 2007/0177674 A1 | 8/2007 | Yang | |
| 2008/0043845 A1 | 2/2008 | Nakaishi | |
| 2008/0069462 A1 | 3/2008 | Abe | |
| 2008/0117985 A1* | 5/2008 | Chen et al. | 375/240.26 |
| 2009/0238269 A1* | 9/2009 | Pandit et al. | 375/240.12 |

FOREIGN PATENT DOCUMENTS

| | | |
|---|---|---|
| EP | 0 397 402 | 11/1990 |
| EP | 0 526 163 | 2/1993 |
| EP | 0 535 746 | 4/1993 |
| EP | 0 540 350 | 5/1993 |
| EP | 0 555 016 | 8/1993 |
| EP | 0 588 653 | 3/1994 |
| EP | 0 614 318 | 9/1994 |
| EP | 0 625 853 | 11/1994 |
| EP | 0 771 114 | 5/1997 |
| EP | 0 782 343 | 7/1997 |
| EP | 0 786 907 | 7/1997 |
| EP | 0 830 029 | 3/1998 |
| EP | 0 863 673 | 9/1998 |
| EP | 0 863 674 | 9/1998 |
| EP | 0 863 675 | 9/1998 |
| EP | 0 874 526 | 10/1998 |
| EP | 0 884 912 | 12/1998 |
| EP | 0 901 289 | 3/1999 |
| EP | 0 944 245 | 9/1999 |
| EP | 0 959 628 | 11/1999 |
| EP | 1 006 732 | 7/2000 |
| EP | 1427216 | 6/2006 |
| GB | 2328337 | 2/1999 |

| | | |
|---|---|---|
| GB | 2332115 | 6/1999 |
| GB | 2343579 | 5/2000 |
| JP | 61-205086 | 9/1986 |
| JP | 62 213 494 | 9/1989 |
| JP | 3-001688 | 1/1991 |
| JP | 3 129 986 | 3/1991 |
| JP | 6 078 298 | 3/1994 |
| JP | 6-078295 | 3/1994 |
| JP | 06-276481 | 9/1994 |
| JP | 06-276511 | 9/1994 |
| JP | 6-292188 | 10/1994 |
| JP | 07-274171 | 10/1995 |
| JP | 08-140099 | 5/1996 |
| JP | 09-121355 | 5/1997 |
| JP | 09-322163 | 12/1997 |
| JP | 10056644 | 2/1998 |
| JP | 11 136683 | 5/1999 |
| JP | 2000-307672 | 11/2000 |
| JP | 2001-025014 | 1/2001 |
| JP | 2002-118598 | 4/2002 |
| JP | 2002-121053 | 4/2002 |
| JP | 2002-156266 | 5/2002 |
| JP | 2002-177889 | 6/2002 |
| JP | 2002-193027 | 7/2002 |
| JP | 2002-204713 | 7/2002 |
| JP | 2004-208259 | 8/2004 |
| KR | 1003538510000 | 1/2002 |
| RU | 2182727 | 5/2002 |
| WO | WO 98/03018 | 1/1998 |
| WO | WO 00/33581 | 8/2000 |
| WO | WO 01/11893 | 2/2001 |
| WO | WO 01/56298 | 8/2001 |
| WO | WO 01/95633 | 12/2001 |
| WO | WO 02/37859 | 5/2002 |
| WO | WO 02/43399 | 5/2002 |
| WO | WO 02/062074 | 8/2002 |
| WO | WO 03/026296 | 3/2003 |
| WO | WO 03/047272 | 6/2003 |
| WO | WO 03/090473 | 10/2003 |
| WO | WO 03/090475 | 10/2003 |
| WO | WO 2005/004491 | 1/2005 |
| WO | WO2008023967 | 1/2008 |

OTHER PUBLICATIONS

Tourapis, Alexis Michael et al. "Direct Mode Coding for Bipredictive Slices in the H.264 Standard", Jan. 2005.*
U.S. Appl. No. 60/341,674, filed Dec. 17, 2001, Lee et al.
U.S. Appl. No. 60/488,710, filed Jul. 18, 2003, Srinivasan et al.
U.S. Appl. No. 60/501,081, filed Sep. 7, 2003, Srinivasan et al.
Abe et al., "Clarification and Improvement of Direct Mode," JVT-D033, 9 pp. (document marked Jul. 16, 2002).
Anonymous, "DivX Multi Standard Video Encoder," 2 pp. (document marked Nov. 2005).
Chalidabhongse et al., "Fast motion vector estimation using multiresolution spatio-temporal correlations," *IEEE Transactions on Circuits and Systems for Video Technology*, pp. 477-488 (Jun. 1997).
Chen et al., "Optimizing INTRA/INTER Coding Mode Decisions," *Proc. Int'l Symp. On Multimedia Info. Processing*, pp. 561-568 (Dec. 1997).
Conklin et al., "Multi-resolution Motion Estimation," *Proc. ICASSP '97*, Munich, Germany, 4 pp. (Apr. 1997).
Ericsson, "Fixed and Adaptive Predictors for Hybrid Predictive/Transform Coding," *IEEE Transactions on Comnm.*, vol. COM-33, No. 12, pp. 1291-1302 (Dec. 1985).
Flierl et al., "Multihypothesis Motion Estimation for Video Coding," *Proc. DCC*, 10 pp. (Mar. 2001).
Fogg, "Survey of Software and Hardware VLC Architectures," *SPIE*, vol. 2186, pp. 29-37 (Feb. 9-10, 1994).
Girod, "Efficiency Analysis of Multihypothesis Motion-Compensated Prediction for Video Coding," *IEEE Transactions on Image Processing*, vol. 9, No. 2, pp. 173-183 (Feb. 2000).
Girod, "Motion-Compensation: Visual Aspects, Accuracy, and Fundamental Limits," *Motion Analysis and Image Sequence Processing*, Kluwer Academic Publishers, pp. 125-152 (Mar. 1993).
Grigoriu, "Spatio-temporal compression of the motion field in video coding," 2001 IEEE Fourth Workshop on Multimedia Signal Processing, pp. 129-134 (Oct. 2001).
Gu et al., "Introducing Direct Mode P-picture (DP) to reduce coding complexity," Joint Video Team (JVT) of ISO/IEC MPEG & ITU-T VCEG, Document No. JVT-C044, 10 pp. (Mar. 2002).
Horn et al., "Estimation of Motion Vector Fields for Multiscale Motion Compensation," *Proc. Picture Coding Symp. (PCS 97)*, pp. 141-144 (Sep. 1997).
Hsu et al., "A Low Bit-Rate Video Codec Based on Two-Dimensional Mesh Motion Compensation with Adaptive Interpolation," *IEEE Transactions on Circuits and Systems for Video Technology*, vol. 11, No. 1, pp. 111-117 (Jan. 2001).
Huang et al., "Hardware architecture design for variable block size motion estimation in MPEG-4 AVC/JVT/ITU-T H.264," *Proc. of the 2003 Int'l Symposium on Circuits & Sys.* (ISCAS '03), vol. 2, pp. 796-799 (May 2003).
ISO/IEC, "Test Model 5," ISO/IEC JTC1/SC29/WG11/ N0400, Study Group 15, Document AVC-491b, pp. 1-119 (Apr. 1993).
ISO/IEC, "MPEG-4 Video Verification Model Version 18.0," (Lee et al.), ISO/IEC JTC1/SC29/WG11 N3908, Pisa, pp. 1-10, 299-311 (Jan. 2001).
ISO/IEC, "ISO/IEC 11172-2: Information Technology—Coding of Moving Pictures and Associated Audio for Storage Mediaat up to About 1.5 Mbit/s," 122 pp. (Aug. 1993).
ISO/IEC, "Information Technology—Coding of Audio-Visual Objects: Visual, ISO/IEC 14496-2, Committee Draft, N2202," 330 pp. (Mar. 1998).
ISO/IEC, "MPEG-4 Video Verification Model Version 10.0," (Ebrahimi) ISO/IEC JTC1/SC29/WG11, MPEG98/N1992, 305 pp. (Feb. 1998).
ITU—Q15-F-24, "MVC Video Codec—Proposal for H.26L," Study Group 16, Video Coding Experts Group (Question 15), 28 pp. (document marked as generated in Oct. 1998).
ITU-T, "ITU-T Recommendation H.261: Video Codec for Audiovisual Services at $p \times 64$ kbits," 28 pp. (Mar. 1993).
ITU-T, "ITU-T Recommendation H.262: Information Technology—Generic Coding of Moving Pictures and Associated Audio Information: Vidoe," 218 pp. (Jul. 1995).
ITU-T, "ITU-T Recommendation H.263: Video Coding for Low Bit Rate Communication," 167 pp. (Feb. 1998).
Jeon et al., "B picture coding for sequence with repeating scene changes," JVT-C120, 9 pp. (document marked May 1, 2002).
Joint Video Team (JVT) of ISO/IEC MPEG and ITU-T VCEG, Working Draft No. 2, Revision 2 (WD-2), JVT-B118r2, 106 pp. (Jan. 2002).
Joint Video Team of ISO/IEC MPEG and ITU-T VCEG, "Text of Committee Draft of Joint Video Specification (ITU-T Rec. H.264, ISO/IEC 14496-10 AVC)," Document JVT-C167, 142 pp. (May 2002).
Joint Video Team of ISO/IEC MPEG and ITU-T VCEG, "Joint Final Committee Draft (JFCD) of Joint Video Specification (ITU-T Recommendation H.264, ISO/IEC 14496-10 AVC," JVT-D157 (Aug. 2002).
Joint Video Team (JVT) of ISO/IEC MPEG and ITU-T VCEG, "Joint Model No. 1, Revision 1 (JM-1r1)," JVT-A003r1, Pattaya, Thailand, 80 pp. (Dec. 2001) [document marked "Generated: Jan. 18, 2002"].
Joint Video Team (JVT) of ISO/IEC MPEG and ITU-T VCEG, "Study of Final Committee Draft of Joint Video Specification," JVT-F100, Awaji Island, 242 pp. (Dec. 2002).
Kim et al., "Low-Complexity Macroblock Mode Selection for H.264/AVC Encoders," *IEEE Int. Conf. on Image Processing*, vol. 2, pp. 765-768 (Oct. 2004).
Kondo et al., "New Prediction Method to Improve B-picture Coding Efficiency," VCEG-026, 9 pp. (document marked Nov. 26, 2001).
Kondo et al., "Proposal of Minor Changes to Multi-frame Buffering Syntax for Improving Coding Efficiency of B-pictures," JVT-B057, 10 pp. (document marked Jan. 23, 2002).
Konrad et al., "On Motion Modeling and Estimation for Very Low Bit Rate Video Coding," *Visual Comm. & Image Processing (VCIP '95)*, 12 pp. (May 1995).
Kossentini et al., "Predictive RD Optimized Motion Estimation for Very Low Bit-rate Video Coding," IEEE J. on Selected Areas in Communications, vol. 15, No. 9 pp. 1752-1763 (Dec. 1997).

Lainema et al., "Skip Mode Motion Compensation," Joint Video Team (JVT) of ISO/IEC MPEG & ITU-T VCEG (ISO/IEC JTC1/SC29/WG11 and ITU-T SG16 Q.6), Document JVT-C027, 8 pp. (May 2002).

Panusopone et al., "Direct Prediction for Predictive (P) Picture in Field Coding mode," Joint Video Team (JVT) of ISO/IEC MPEG & ITU-T VCEG, Document JVT-D046, 8 pp. (Jul. 2002).

Patel et al., "Performance of a Software MPEG Video Decoder," *Proc. of the First ACM Intl Conf on Multimedia,* pp. 75-82 (Aug. 1993).

Printouts of FTP directories from http://ftp3.itu.ch, 8 pp. (downloaded from the World Wide Web on Sep. 20, 2005).

Reader, "History of MPEG Video Compression—Ver. 4.0," 99 pp. (document marked Dec. 16, 2003).

Schwarz et al., "Tree-structured macroblock partition," ITU-T SG16/Q.6 VCEG-O17, 6 pp. (Dec. 2001).

Schwarz et al., "Core Experiment Results on Improved Macroblock Prediction Modes," Joint Video Team (JVT) of ISO/IEC MPEG & ITU-T VCEG (ISO/IEC JTC1/SC29/WG11 and ITU-T SG16 Q.6), Document JVT-B054, 10 pp. (Jan.-Feb. 2002).

Sullivan et al., "The H.264/AVC Advanced Video Coding Standard: Overview and Introduction to the Fidelity Range Extensions," 21 pp. (Aug. 2004).

"The TML Project WEB-Page and Archive," (including pages of code marked "image.cpp for H.26L decoder, Copyright 1999" and "image.c"), 24 pp. (document marked Sep. 2001).

Tourapis et al., "Direct Prediction for Predictive (P) and Bidirectionally Predictive (B) frames in Video Coding," Joint Video Team (JVT) of ISO/IEC MPEG & ITU-T VCEG (ISO/IEC JTC1/SC29/WG11 and ITU-T SG16 Q.6), Document JVT-C128, 11 pp. (May 2002).

Tourapis et al., "Motion Vector Prediction in Bidirectionally Predictive (B) frames with regards to Direct Mode," Joint Video Team (JVT) of ISO/IEC MPEG & ITU-T VCEG (ISO/IEC JTC1/SC29/WG11 and ITU-T SG16 Q.6), Document JVT-C127, 7 pp. (May 2002).

Tourapis et al., "Temporal Interpolation of Video Sequences Using Zonal Based Algorithms," *IEEE,* pp. 895-898 (Oct. 2001).

Tourapis et al., "Timestamp Independent Motion Vector Prediction for P and B frames with Division Elimination," Joint Video Team (JVT) of ISO/IEC MPEG & ITU-T VCEG (ISO/IEC JTC1/SC29/WG11 and ITU-T SG16 Q.6), Document JVT-D040, 18 pp. (Jul. 2002).

Tourapis et al., "Performance Comparison of Temporal and Spatial Direct mode," Joint Video Team (JVT) of ISO/IEC MPEG & ITU-T VCEG (ISO/IEC JTC1/SC29/WG11 and ITU-T SG16 Q.6), Document JVT-E026, 7 pp. (Oct. 2002).

Wang et al., "Adaptive frame/field coding for JVT Video Coding," ITU-T SG16 Q.6 JVT-B071, 24 pp. (Jan. 2002).

Wang et al., "Interlace Coding Tools for H.26L Video Coding," ITU-T SG16/Q.6 VCEG-037, pp. 1-20 (Dec. 2001).

Wiegand, "H.26L Test Model Long-Term No. 9 (TML-9) draft 0," ITU-Telecommunications Standardization Sector, Study Group 16, VCEG-N83, 74 pp. (Dec. 2001).

Wiegand et al., "Motion-compensating Long-term Memory Prediction," *Proc. Int'l Conf. on Image Processing,* 4 pp. (Oct. 1997).

Wiegand et al., "Long-term Memory Motion Compensated Prediction," *IEEE Transactions on Circuits & Systems for Video Technology,* vol. 9, No. 1, pp. 70-84 (Feb. 1999).

Wien, "Variable Block-Size Transforms for Hybrid Video Coding," Dissertation, 182 pp. (Feb. 2004).

Wu et al., "Joint estimation of forward and backward motion vectors for interpolative prediction of video," *IEEE Transactions on Image Processing,* vol. 3, No. 5, pp. 684-687 (Sep. 1994).

Yu et al., "Two-Dimensional Motion Vector Coding for Low Bitrate Videophone Applications," *Proc. Int'l Conf. on Image Processing,* Los Alamitos, US, pp. 414-417, IEEE Comp. Soc. Press (Oct. 1995).

Pourazad et al., "An H.264-based Video Encoding Scheme for 3D TV," EURASIP European Signal Processing Conference—EUSIPCO, Florence, Italy, 5 pages (Sep. 2006).

Ko et al., "Fast Intra-Mode Decision Using Inter-Frame Correlation for H.264/AVC," Proc. IEEE ISCE 2008, 4 pages (Apr. 2008).

* cited by examiner software 180 implementing one or more local picture ID or computation of co-located information decoding innovations

LOCAL PICTURE IDENTIFIER AND COMPUTATION OF CO-LOCATED INFORMATION

BACKGROUND

Companies and consumers increasingly depend on computers to process, distribute, and play back high quality video content. Engineers use compression (also called source coding or source encoding) to reduce the bit rate of digital video. Compression decreases the cost of storing and transmitting video information by converting the information into a lower bit rate form. Decompression (also called decoding) reconstructs a version of the original information from the compressed form. A "codec" is an encoder/decoder system.

Compression can be lossless, in which the quality of the video does not suffer, but decreases in bit rate are limited by the inherent amount of variability (sometimes called source entropy) of the input video data. Or, compression can be lossy, in which the quality of the video suffers, and the lost quality cannot be completely recovered, but achievable decreases in bit rate are more dramatic. Lossy compression is often used in conjunction with lossless compression—lossy compression establishes an approximation of information, and the lossless compression is applied to represent the approximation.

A basic goal of lossy compression is to provide good rate-distortion performance. So, for a particular bit rate, an encoder attempts to provide the highest quality of video. Or, for a particular level of quality/fidelity to the original video, an encoder attempts to provide the lowest bit rate encoded video. In practice, considerations such as encoding time, encoding complexity, encoding resources, decoding time, decoding complexity, decoding resources, overall delay, and/or smoothness in quality/bit rate changes also affect decisions made in codec design as well as decisions made during actual encoding.

In general, video compression techniques include "intra-picture" compression and "inter-picture" compression. Intra-picture compression techniques compress a picture with reference to information within the picture, and inter-picture compression techniques compress a picture with reference to a preceding and/or following picture (often called a reference or anchor picture) or pictures.

For intra-picture compression, for example, an encoder splits a picture into 8×8 blocks of samples, where a sample is a number that represents the intensity of brightness or the intensity of a color component for a small, elementary region of the picture, and the samples of the picture are organized as arrays or planes. The encoder applies a frequency transform to individual blocks. The frequency transform converts an 8×8 block of samples into an 8×8 block of transform coefficients. The encoder quantizes the transform coefficients, which may result in lossy compression. For lossless compression, the encoder entropy codes the quantized transform coefficients.

Inter-picture compression techniques often use motion estimation and motion compensation to reduce bit rate by exploiting temporal redundancy in a video sequence. Motion estimation is a process for estimating motion between pictures. For example, for an 8×8 block of samples or other unit of the current picture, the encoder attempts to find a match of the same size in a search area in another picture, the reference picture. Within the search area, the encoder compares the current unit to various candidates in order to find a candidate that is a good match. When the encoder finds an exact or "close enough" match, the encoder parameterizes the change in position between the current and candidate units as motion data (such as a motion vector ("MV")). In general, motion compensation is a process of reconstructing pictures from reference picture(s) using motion data.

The example encoder also computes the sample-by-sample difference between the original current unit and its motion-compensated prediction to determine a residual (also called a prediction residual or error signal). The encoder then applies a frequency transform to the residual, resulting in transform coefficients. The encoder quantizes the transform coefficients and entropy codes the quantized transform coefficients.

If an intra-compressed picture or motion-predicted picture is used as a reference picture for subsequent motion compensation, the encoder reconstructs the picture. A decoder also reconstructs pictures during decoding, and it uses some of the reconstructed pictures as reference pictures in motion compensation. For example, for an 8×8 block of samples of an intra-compressed picture, an example decoder reconstructs a block of quantized transform coefficients. The example decoder and encoder perform inverse quantization and an inverse frequency transform to produce a reconstructed version of the original 8×8 block of samples.

As another example, the example decoder or encoder reconstructs an 8×8 block from a prediction residual for the block. The decoder decodes entropy-coded information representing the prediction residual. The decoder/encoder inverse quantizes and inverse frequency transforms the data, resulting in a reconstructed residual. In a separate motion compensation path, the decoder/encoder computes an 8×8 predicted block using motion vector information for displacement from a reference picture. The decoder/encoder then combines the predicted block with the reconstructed residual to form the reconstructed 8×8 block.

I. Video Codec Standards.

Over the last two decades, various video coding and decoding standards have been adopted, including the H.261, H.262 (MPEG-2) and H.263 series of standards and the MPEG-1 and MPEG-4 series of standards. More recently, the H.264 standard (sometimes referred to as H.264/AVC) and VC-1 standard have been adopted. For additional details, see representative versions of the respective standards.

Such a standard typically defines options for the syntax of an encoded video bit stream according to the standard, detailing the parameters that must be in the bit stream for a video sequence, picture, block, etc. when particular features are used in encoding and decoding. The standards also define how a decoder conforming to the standard should interpret the bit stream parameters—the bit stream semantics. In many cases, the standards provide details of the decoding operations the decoder should perform to achieve correct results. Often, however, the low-level implementation details of the operations are not specified, or the decoder is able to vary certain implementation details to improve performance, so long as the correct decoding results are still achieved.

During development of a standard, engineers may concurrently generate reference software, sometimes called verification model software or JM software, to demonstrate rate-distortion performance advantages of the various features of the standard. Typical reference software provides a "proof of concept" implementation that is not algorithmically optimized or optimized for a particular hardware platform. Moreover, typical reference software does not address multithreading implementation decisions, instead assuming a single threaded implementation for the sake of simplicity.

II. Acceleration of Video Decoding and Encoding.

While some video decoding and encoding operations are relatively simple, others are computationally complex. For example, inverse frequency transforms, fractional sample interpolation operations for motion compensation, in-loop deblock filtering, post-processing filtering, color conversion, and video re-sizing can require extensive computation. This computational complexity can be problematic in various scenarios, such as decoding of high-quality, high-bit rate video (e.g., compressed high-definition video). In particular, decoding tasks according to more recent standards such as H.264 and VC-1 can be computationally intensive and consume significant memory resources.

Some decoders use video acceleration to offload selected computationally intensive operations to a graphics processor. For example, in some configurations, a computer system includes a primary central processing unit ("CPU") as well as a graphics processing unit ("GPU") or other hardware specially adapted for graphics processing. A decoder uses the primary CPU as a host to control overall decoding and uses the GPU to perform simple operations that collectively require extensive computation, accomplishing video acceleration.

In a typical software architecture for video acceleration during video decoding, a video decoder controls overall decoding and performs some decoding operations using a host CPU. The decoder signals control information (e.g., picture parameters, macroblock parameters) and other information to a device driver for a video accelerator (e.g., with GPU) across an acceleration interface.

The acceleration interface is exposed to the decoder as an application programming interface ("API"). The device driver associated with the video accelerator is exposed through a device driver interface ("DDI"). In an example interaction, the decoder fills a buffer with instructions and information then calls a method of an interface to alert the device driver through the operating system. The buffered instructions and information, opaque to the operating system, are passed to the device driver by reference, and video information is transferred to GPU memory if appropriate. While a particular implementation of the API and DDI may be tailored to a particular operating system or platform, in some cases, the API and/or DDI can be implemented for multiple different operating systems or platforms.

In some cases, the data structures and protocol used to parameterize acceleration information are conceptually separate from the mechanisms used to convey the information. In order to impose consistency in the format, organization and timing of the information passed between the decoder and device driver, an interface specification can define a protocol for instructions and information for decoding according to a particular video decoding standard or product. The decoder follows specified conventions when putting instructions and information in a buffer. The device driver retrieves the buffered instructions and information according to the specified conventions and performs decoding appropriate to the standard or product. An interface specification for a specific standard or product is adapted to the particular bit stream syntax and semantics of the standard/product.

Given the critical importance of video compression and decompression to digital video, it is not surprising that compression and decompression are richly developed fields. Whatever the benefits of previous techniques and tools, however, they do not have the advantages of the following techniques and tools.

SUMMARY

In summary, techniques and tools are described for various aspects of video decoder implementations. These techniques and tools help, for example, to increase decoding speed to facilitate real time decoding, reduce computational complexity, and/or reduce memory utilization (e.g., for use in scenarios such as those with processing power constraints and/or delay constraints).

According to one aspect of the techniques and tools described herein, a decoder receives encoded video information in a bitstream and during decoding identifies a temporal direct prediction mode macroblock, where the temporal direct prediction mode macroblock is associated with a reference picture list, and where reference pictures of the reference picture list are identified using local picture identifiers. The decoder then identifies a co-located macroblock of the temporal direct prediction mode macroblock, where the co-located macroblock uses one or more reference pictures. Next, the decoder identifies one or more reference pictures in the reference picture list that match the one or more reference pictures used by the co-located macroblock, where the identifying the one or more reference pictures in the reference picture list uses local picture identifiers. Finally, the decoder uses the identified one or more reference pictures in reconstruction of the temporal direct prediction mode macroblock. In a specific implementation, the local picture identifiers are 8-bit local picture identifiers. In other implementations, different length local picture identifiers are used (e.g., 5-bit and 32-bit local picture identifiers).

In a specific implementation, a table is used to identify matching reference pictures. For example, the decoder creates a table that stores reference picture list index values for reference pictures in the reference picture list, where the stored reference picture list index values are indexed in the table by their respective local picture identifiers. The decoder performs the identification by looking up local picture identifiers of the one or more reference pictures used by the co-located macroblock in the table and retrieving corresponding reference picture list index values, where the retrieved reference picture list index values identify the one or more reference pictures in the reference picture list of the temporal direct prediction mode macroblock that match the one or more reference pictures used by the co-located macroblock.

According to another aspect of the techniques and tools described herein, a decoder receives encoded video information in a bitstream and during decoding performs loop filtering on a macroblock. For example, the loop filtering comprises calculating boundary strength values for plural blocks, where the calculating comprises determining whether reference pictures used by the plural blocks are the same by comparing local picture identifiers of the reference pictures. In a specific implementation, the local picture identifiers are 8-bit local picture identifiers. In other implementations, different length local picture identifiers are used (e.g., 5-bit and 32-bit local picture identifiers).

According to yet another aspect of the techniques and tools described herein, a decoder receives encoded video information in a bitstream and during decoding determines a picture type of a picture and based on the picture type selectively skips or simplifies computation of co-located information for use in reconstructing direct prediction mode macroblocks (e.g., temporal or spatial direct prediction mode macroblocks) outside the picture.

The various techniques and tools can be used in combination or independently. Additional features and advantages will be made more apparent from the following detailed description of different embodiments, which proceeds with reference to the accompanying figures.

DETAILED DESCRIPTION

Figure 1:
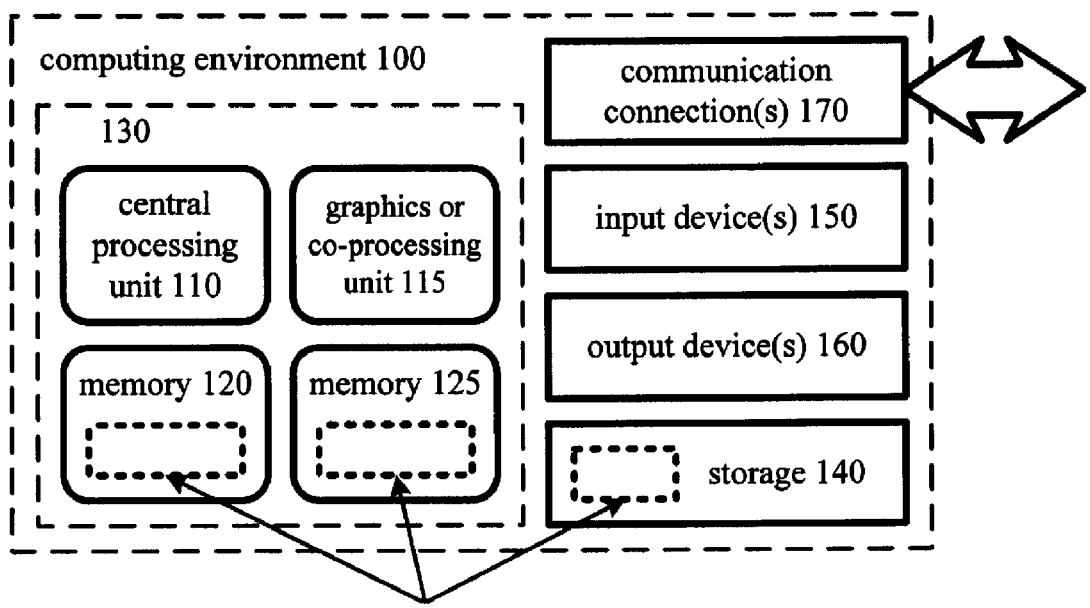
FIG. 1 is a block diagram illustrating a generalized example of a suitable computing environment in which several of the described embodiments may be implemented.

The present application relates to innovations in implementations of video decoders. Many of these innovations reduce decoding complexity and/or increase decoding speed to improve decoding performance. These innovations include the use of local picture identifiers (IDs). Local picture identifiers can be used during computation of co-located information and during deblock filtering. For example, an 8-bit local picture ID can be used in place of a global 64-bit picture ID. These innovations also include improvements in computation of co-located information. For example, a picture type can be used during computation of co-located information to improve computation efficiency (e.g., speed and memory utilization) during video decoding.

The innovations described herein can be implemented by single-threaded or multi-threaded decoders. In some implementations, a multi-threaded decoder uses decoder modules that facilitate multi-threaded decoding. For example, in some implementations a PED module is used. The PED module finds a complete picture from the bit stream and initializes the parameters and data structures that will be used for decoding the picture. The PED module populates some of the initialized parameters and structures with parameters parsed from the bit stream. The PED module also enters the initialized (but as yet un-decoded) picture into a live DPB, which facilitates multithreaded decoding. For additional detail, see U.S. Patent Application Publication No. 2009-0003446-A1, entitled "COMPUTING COLLOCATED MACROBLOCK INFORMATION FOR DIRECT MODE MACROBLOCKS," the disclosure of which is hereby incorporated by reference.

Collectively, these improvements are at times loosely referred to as "optimizations." As used conventionally and as used herein, the term "optimization" means an improvement that is deemed to provide a good balance of performance in a particular scenario or platform, considering computational complexity, memory use, processing speed, and/or other factors. Use of the term "optimization" does not foreclose the possibility of further improvements, nor does it foreclose the possibility of adaptations for other scenarios or platforms.

With these innovations, efficient decoder implementations have been provided for diverse platforms. The implementations include media players for gaming consoles with complex, special-purpose hardware and graphics capabilities, personal computers, and set-top boxes/digital video receivers.

Various alternatives to the implementations described herein are possible. For example, certain techniques described with reference to flowchart diagrams can be altered by changing the ordering of stages shown in the flowcharts, by repeating or omitting certain stages, etc., while achieving the same result. As another example, although some implementations are described with reference to specific macroblock formats, other formats also can be used. As another example, while several of the innovations described below are presented in terms of H.264/AVC decoding examples, the innovations are also applicable to other types of decoders (e.g., MPEG-2, VC-1) that provide or support the same or similar decoding features.

The various techniques and tools described herein can be used in combination or independently. For example, although flowcharts in the figures typically illustrate techniques in isolation from other aspects of decoding, the illustrated techniques in the figures can typically be used in combination with other techniques (e.g., shown in other figures). Different embodiments implement one or more of the described techniques and tools. Some of the techniques and tools described herein address one or more of the problems noted in the Background. Typically, a given technique/tool does not solve all such problems, however. Rather, in view of constraints and tradeoffs in decoding time and/or resources, the given technique/tool improves performance for a particular implementation or scenario.

I. Computing Environment

FIG. 1 illustrates a generalized example of a suitable computing environment (100) in which several of the described embodiments may be implemented. The computing environment (100) is not intended to suggest any limitation as to scope of use or functionality, as the techniques and tools may be implemented in diverse general-purpose or special-purpose computing environments.

With reference to FIG. 1, the computing environment (100) includes at least one CPU (110) and associated memory (120) as well as at least one GPU or other co-processing unit (115) and associated memory (125) used for video acceleration. In FIG. 1, this most basic configuration (130) is included within a dashed line. The processing unit (110) executes computer-executable instructions and may be a real or a virtual processor. In a multi-processing system, multiple processing units execute computer-executable instructions to increase processing power. A host encoder or decoder process offloads certain computationally intensive operations (e.g., fractional sample interpolation for motion compensation, in-loop deblock filtering) to the GPU (115). The memory (120, 125) may be volatile memory (e.g., registers, cache, RAM), non-volatile memory (e.g., ROM, EEPROM, flash memory, etc.), or some combination of the two. The memory (120, 125) stores software (180) for a decoder implementing one or more of the decoder innovations described herein.

A computing environment may have additional features. For example, the computing environment (100) includes storage (140), one or more input devices (150), one or more output devices (160), and one or more communication connections (170). An interconnection mechanism (not shown) such as a bus, controller, or network interconnects the components of the computing environment (100). Typically, operating system software (not shown) provides an operating environment for other software executing in the computing environment (100), and coordinates activities of the components of the computing environment (100).

The computer-readable storage medium (140) may be removable or non-removable, and includes magnetic disks, magnetic tapes or cassettes, CD-ROMs, DVDs, or any other tangible medium which can be used to store information and which can be accessed within the computing environment (100). The computer-readable storage medium (140) may also include the memory (120) and (125) (e.g., RAM, ROM, flash memory, etc.). The storage (140) stores instructions for the software (180). The computer-readable storage medium (140) does not include the communication medium (170) described below (e.g., signals).

The input device(s) (150) may be a touch input device such as a keyboard, mouse, pen, or trackball, a voice input device, a scanning device, or another device that provides input to the computing environment (100). For audio or video encoding, the input device(s) (150) may be a sound card, video card, TV tuner card, or similar device that accepts audio or video input in analog or digital form, or a CD-ROM or CD-RW that reads audio or video samples into the computing environment (100). The output device(s) (160) may be a display, printer, speaker, CD-writer, or another device that provides output from the computing environment (100).

The communication connection(s) (170) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The techniques and tools can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "decide," "make" and "get" to describe computer operations in a computing environment. These terms are high-level abstractions for operations performed by a computer, and should not be confused with acts performed by a human being. The actual computer operations corresponding to these terms vary depending on implementation.

II. Example Organization of Video Frames

For progressive video, lines of a video frame contain samples starting from one time instant and continuing through successive lines to the bottom of the frame. An interlaced video frame consists of two scans—one for the even lines of the frame (the top field) and the other for the odd lines of the frame (the bottom field).

A progressive video frame can be divided into 16×16 macroblocks. For 4:2:0 format, a 16×16 macroblock includes four 8×8 blocks (Y0 through Y3) of luma (or brightness) samples and two 8×8 blocks (Cb, Cr) of chroma (or color component) samples, which are collocated with the four luma blocks but half resolution horizontally and vertically.

An interlaced video frame includes alternating lines of the top field and bottom field. The two fields may represent two different time periods or they may be from the same time period. When the two fields of a frame represent different time periods, this can create jagged tooth-like features in regions of the frame where motion is present.

Therefore, interlaced video frames can be rearranged according to a field structure, with the odd lines grouped together in one field, and the even lines grouped together in another field. This arrangement, known as field coding, is useful in high-motion pictures. For an interlaced video frame organized for encoding/decoding as separate fields, each of the two fields of the interlaced video frame is partitioned into macroblocks. The top field is partitioned into macroblocks, and the bottom field is partitioned into macroblocks. In the luma plane, a 16×16 macroblock of the top field includes 16 lines from the top field, and a 16×16 macroblock of the bottom field includes 16 lines from the bottom field, and each line is 16 samples long.

On the other hand, in stationary regions, image detail in the interlaced video frame may be more efficiently preserved without rearrangement into separate fields. Accordingly, frame coding (at times referred to coding with MBAFF pictures) is often used in stationary or low-motion interlaced video frames. An interlaced video frame organized for encoding/decoding as a frame is also partitioned into macroblocks. In the luma plane, each macroblock includes 8 lines from the top field alternating with 8 lines from the bottom field for 16 lines total, and each line is 16 samples long. Within a given macroblock, the top-field information and bottom-field information may be coded jointly or separately at any of various phases—the macroblock itself may be field-coded or frame-coded.

III. Generalized Video Decoder

Figure 2:
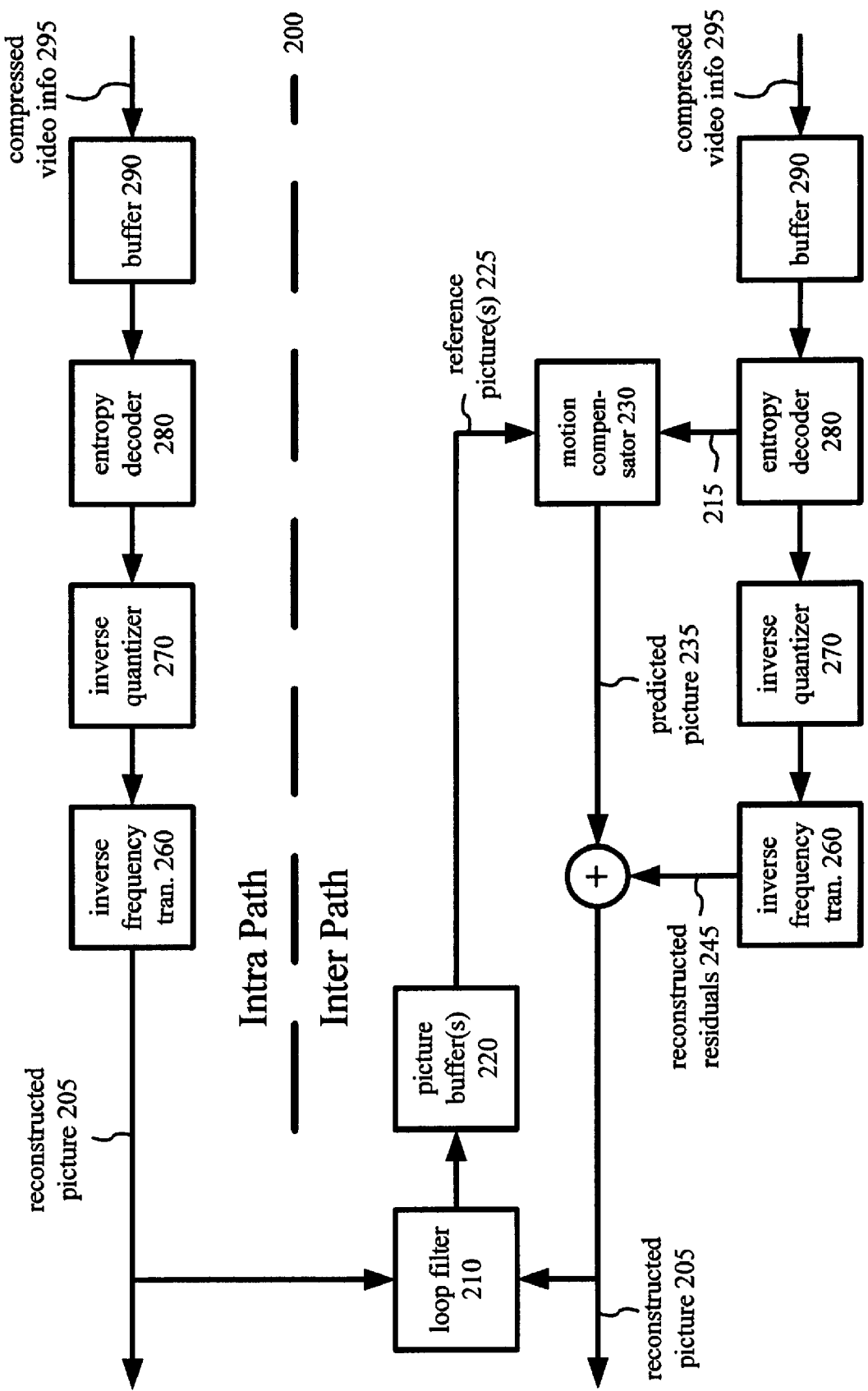
FIG. 2 is a block diagram of a generalized video decoder in conjunction with which several of the described embodiments may be implemented.

FIG. 2 is a block diagram of a generalized video decoder (200) in conjunction with which several described embodiments may be implemented. A corresponding video encoder (not shown) may also implement one or more of the described embodiments.

The relationships shown between modules within the decoder (200) indicate general flows of information in the decoder; other relationships are not shown for the sake of simplicity. In particular, while a decoder host performs some operations of modules of the decoder (200), a video accelerator performs other operations (such as inverse frequency transforms, fractional sample interpolation, motion compensation, in-loop deblocking filtering, color conversion, post-processing filtering and/or picture re-sizing). For example, the decoder (200) passes instructions and information to the video accelerator as described in "Microsoft DirectX VA: Video Acceleration API/DDI," version 1.01, a later version of DXVA or another acceleration interface. In general, once the video accelerator reconstructs video information, it maintains some representation of the video information rather than passing information back. For example, after a video accelerator reconstructs an output picture, the accelerator stores it in a picture store, such as one in memory associated with a GPU, for use as a reference picture. The accelerator then performs in-loop deblock filtering and fractional sample interpolation on the picture in the picture store.

In some implementations, different video acceleration profiles result in different operations being offloaded to a video accelerator. For example, one profile may only offload out-of-loop, post-decoding operations, while another profile offloads in-loop filtering, fractional sample interpolation and motion compensation as well as the post-decoding operations. Still another profile can further offload frequency transform operations. In still other cases, different profiles each include operations not in any other profile.

Returning to FIG. 2, the decoder (200) processes video pictures, which may be video frames, video fields or combinations of frames and fields. The bit stream syntax and semantics at the picture and macroblock levels may depend on whether frames or fields are used. The decoder (200) is block-based and uses a 4:2:0 macroblock format for frames. For fields, the same or a different macroblock organization and format may be used. 8×8 blocks may be further sub-divided at different stages. Alternatively, the decoder (200) uses a different macroblock or block format, or performs operations on sets of samples of different size or configuration.

The decoder (200) receives information (295) for a compressed sequence of video pictures and produces output including a reconstructed picture (205) (e.g., progressive video frame, interlaced video frame, or field of an interlaced video frame). The decoder system (200) decompresses predicted pictures and key pictures. For the sake of presentation, FIG. 2 shows a path for key pictures through the decoder system (200) and a path for predicted pictures. Many of the components of the decoder system (200) are used for decompressing both key pictures and predicted pictures. The exact operations performed by those components can vary depending on the type of information being decompressed.

A demultiplexer (290) receives the information (295) for the compressed video sequence and makes the received information available to the entropy decoder (280). The entropy decoder (280) entropy decodes entropy-coded quantized data as well as entropy-coded side information, typically applying the inverse of entropy encoding performed in the encoder. A motion compensator (230) applies motion information (215) to one or more reference pictures (225) to form motion-compensated predictions (235) of sub-blocks, blocks and/or macroblocks of the picture (205) being reconstructed. One or more picture stores store previously reconstructed pictures for use as reference pictures.

The decoder (200) also reconstructs prediction residuals. An inverse quantizer (270) inverse quantizes entropy-decoded data. An inverse frequency transformer (260) converts the quantized, frequency domain data into spatial domain video information. For example, the inverse frequency transformer (260) applies an inverse block transform to sub-blocks and/or blocks of the frequency transform coefficients, producing sample data or prediction residual data for key pictures or predicted pictures, respectively. The inverse frequency transformer (260) may apply an 8×8, 8×4, 4×8, 4×4, or other size inverse frequency transform.

For a predicted picture, the decoder (200) combines reconstructed prediction residuals (245) with motion compensated predictions (235) to form the reconstructed picture (205). A motion compensation loop in the video decoder (200) includes an adaptive deblocking filter (210). The decoder (200) applies in-loop filtering (210) to the reconstructed picture to adaptively smooth discontinuities across block/sub-block boundary rows and/or columns in the picture. The decoder stores the reconstructed picture in a picture buffer (220) for use as a possible reference picture.

Depending on implementation and the type of compression desired, modules of the decoder can be added, omitted, split into multiple modules, combined with other modules, and/or replaced with like modules. In alternative embodiments, encoders or decoders with different modules and/or other configurations of modules perform one or more of the described techniques. Specific embodiments of video decoders typically use a variation or supplemented version of the generalized decoder (200).

For the sake of presentation, the following table provides example explanations for acronyms and selected shorthand terms used herein.

| Term | Explanation |
| --- | --- |
| block | arrangement (in general, having any size) of sample values for pixel data or residual data, for example, including the possible blocks in H.264/AVC - 4 × 4, 4 × 8, 8 × 4, 8 × 8, 8 × 16, 16 × 8, and 16 × 16 |

-continued

| Term | Explanation |
| --- | --- |
| CABAC | context adaptive binary arithmetic coding |
| CAVLC | context adaptive variable length coding |
| DPB | decoded picture buffer |
| ED | entropy decoding |
| FIFO | first in first out |
| INTRA | spatial intra-prediction |
| LF | loop filtering |
| MB | megabyte OR macroblock, depending on context; a macroblock is, e.g., 16 × 16 arrangement of sample values for luma with associated arrangements of sample values for chroma |
| MBAFF | macroblock adaptive frame field |
| MC | motion compensation |
| MMCO | memory management control operation |
| NALU | network abstraction layer unit |
| PED | picture extent discovery |
| PICAFF | picture adaptive frame field |
| PPS | picture parameter set |
| PROG | progressive |
| SEI | supplemental enhancement information |
| SIMD | single instruction multiple data |
| SPS | sequence parameter set |
| stage (of decoding) | a set of different passes/steps to decode a picture, such as PED, ED, MC and so on |
| sub-block | a partition of a sub-MB, e.g., 8 × 4, 4 × 8 or 4 × 4 block or other size block |
| sub-MB | a partition of an MB, e.g., 16 × 8, 8 × 16 or 8 × 8 block or other size block; in some contexts, the term sub-MB also indicates sub-blocks |
| task | a stage plus input data |
| wave | a set of portions of a picture (e.g., a diagonal set of macroblocks in the picture) such that each portion within one wave can be processed in parallel, without dependencies on the other portions within the same wave; a picture can then be processed as a sequence of waves where each wave is dependent on the data resulting from processing the preceding waves |

IV. Local Picture Identifier Innovations for a Video Decoder

In some embodiments, a decoder uses one or more local picture identifier (ID) innovations when decoding video. Collectively, the local picture ID innovations improve computation efficiency (e.g., speed and memory utilization) during video decoding.

A. Overall Local Picture Identifier Framework

In order to identify a picture in a bitstream, the picture's picture identifier (ID) needs to be known. Initially the picture ID is ((POC<<1)+structure) of the picture, where POC is Picture Order Count, and where structure could be frame, top field, or bottom field. Since POC is a 32-bit variable, generally 33 bits are needed. In a typical computing system, the result is a 64-bit picture ID to identify a picture. In an H.264/AVC decoder, there are two places where a determination must be made whether two pictures are the same or not. One is in the computation of co-located pictures for obtaining motion vector information of direct MBs in a B slice, and the other is in the strength computation of loop filtering.

Using a local picture ID (e.g., an 8-bit or 5-bit local picture ID), which can also be called a reduced-bit picture ID, in place of a global 64-bit picture ID provides various performance advantages. For example, 8-bit local picture IDs use $\frac{1}{8}^{th}$ the memory of 64-bit picture IDs. In addition, local picture IDs improve computation efficiency (e.g., using 8-bit comparisons instead of 64-bit comparisons). Use of a local picture ID can also provide efficiency improvements. For example, the x86 architecture handles 64-bit comparisons using two instructions. Reduction of 64-bit to 8 bit data structures allows x86 comparisons to execute in one instruction. In addition, less memory is used. The reduction in bits used to represent the picture ID affects ref_pic_num and co-located remapping data structures. In a specific test scenario, an H.264/AVC decoder using 8-bit local picture IDs showed 4 to 7 MB memory savings using a multi-threading implementation.

B. Usage of Picture ID

In an H.264/AVC decoder, there are two places where a determination needs to be made whether two pictures are the same or not. The first place is with the computation of co-located information for direct macroblocks (MBs). In H.264/AVC, when direct_spatial_mv_pred_flag is 0 (temporal mode is used for direct macroblock), motion vector (MV) and reference picture information needs to be retrieved from the co-located MBs. Specifically, the reference pictures used by the co-located MB of the co-located picture needs to be found in reference list 0 of the current slice. Therefore, the picture IDs of the reference pictures used by the co-located MB needs to be compared with those in the reference list 0 of the current slice.

The second place in an H.264/AVC decoder where a determination needs to be made whether two pictures are the same or not is in the loop filter. In the loop filter, when computing the strength for deblocking, a comparison needs to be made to determine whether two inter blocks are using the same reference pictures or not. In this case, all the pictures used for reference in a picture come from the same Decoded Picture Buffer (DPB), and a DPB can only contain, at most, 16×3 different pictures. If all the pictures in the DPB have different local picture IDs, a determination can be made whether two pictures are the same or not.

C. 8-Bit Local Picture ID

In a specific implementation, an 8-bit local picture ID is used in place of the global 64-bit picture ID. An 8-bit picture ID provides a sufficient number of picture identifiers to perform H.264/AVC decoding even with the use of large-scale multi-threaded decoding.

Generally, there will be less than 32 pictures (frame, top field, or bottom field picture) in flight at the same time, i.e., less than 32 pPicHolders, even with large scale multi-threading. Assume each of the 32 pictures is a frame picture, and will be split into two fields. The 32 pictures in flight will use 96 (32×3) StorablePicture structures. According to the H.264/AVC specification, the maximum DPB size is 16. Therefore, DPB will use 48 (16×3) StorablePicture structures at most.

In addition, if two pictures' frame_num have a gap, a function will be called to fill in the frame_num gap. The maximum number of StorablePicture structures used to fill frame_num gap is 48 (16×3). Because a mechanism is used to release those pictures used for fill frame_num gap right after they are bumped out from DPB, in total only 96 (16×3×2) StorablePicture structures are needed, assuming the worst case that the pictures used for fill_frame_num_gap is bumped out by the pictures used for fill_frame_num_gap again.

Overall, there are a maximum of 240 (96+48+96) StorablePicture structures in flight during the lifetime of an H.264/AVC decoder. When a StorablePicture structure is allocated, a unique 8-bit picture ID can be assigned to it. An 8-bit local picture ID provides 255 unique values, and is thus able to accommodate the maximum of 240 StorablePicture structures. The 8-bit picture ID will be attached to the StorablePicture structure and remain the same during the lifetime of the H.264/AVC decoder.

This specific implementation of a local 8-bit picture ID assumes there will be up to 32 pictures (frame, top field, or bottom field picture) in flight at the same time. However, a local 8-bit picture ID can support up to 37 pictures in flight at the same time. If more than 37 pictures in flight are required, the local picture ID can be extended beyond 8-bits (e.g., a 16-bit local picture ID can be used).

With the loop filter, because the StorablePicture structures come from the same DPB, different StorablePicture structures in the DPB will have different 8-bit picture IDs. Determining whether two references pictures are the same or not can be done easily with the 8-bit picture ID.

In the computation of co-located information, an 8-bit local picture ID is sufficient to decode content conforming to the H.264/AVC specification. The fact that an 8-bit local picture ID can be used to decode conforming content may not be initially obvious when considering the process that finds the corresponding picture in reference list 0 of the current slice for the reference picture used by the co-located MB of the co-located picture. However, it can be proven that this process operates correctly using an 8-bit local picture ID.

Assume there is one slice per picture, without loss of generality. Current picture A is using some pictures as reference in list 0 and list 1. Co-located picture B is using some other pictures as reference in list 0 and list 1. The corresponding pictures in list 0 of current picture A need to be found for the reference pictures used by picture B. In decoding order, co-located picture B is decoded first, some pictures in the middle, and then current picture A. During the decoding process from picture B to picture A, some pictures used as reference by co-located picture B may be bumped out from the DPB, get deleted with a picture ID x, POC y, and structure z and reused again with a picture ID x, POC m, and structure n, since the 8-bit local picture ID will keep the same throughout the lifetime of the H.264/AVC decoder. In this case the two StorablePicture structures have the same 8-bit local picture ID, even though they are actually different pictures. If the StorablePicture structure with a picture ID x, POC y, and structure z is in the reference lists of co-located picture B, and the StorablePicture structure with an picture ID x, POC m, and structure n is in the reference lists of current picture A, they will be treated as the same picture, because now they have the same picture ID x. If this situation ever occurs, it may cause corruption of the decoded content. However, this situation will never occur for conforming content.

According to Section 8.4.1.2.3 of the H.264/AVC specification, when a picture in list 0 or list 1 of the co-located picture is used as reference picture by a co-located MB, the same picture shall be in the list 0 of current picture. That means in the decoding process from co-located picture B to current picture A, the picture cannot get bumped out from DPB and deleted. It also means that when a picture is used as a reference picture by a co-located MB, the picture found in list 0 of the current picture must be the correct match. When a direct MB is decoded in current picture A, the location in list 0 (of current picture A) of the picture used as a reference by the co-located MB is needed. If those reference indices/positions are correct, the direct MB can be decoded correctly. As for those pictures that get bumped out from DPB, deleted, and reused during the decoding process from co-located picture B to current picture A, they will never be used as reference pictures by co-located MB, and therefore it is irrelevant whether the matching for them is correct or not.

D. 5-Bit Local Picture ID

In another specific implementation, a 5-bit local picture ID is used in place of the 64-bit picture ID. A 5-bit local picture ID can be used, for example, with a single-threaded decoder (e.g., either in a DXVA implementation or a software implementation).

E. Alternative Local Picture ID Implementations

Depending on implementation details, a 5-bit or 8-bit local picture ID may not be the most efficient choice. For example, with the XBox 360 architecture, 32-bit operations are more efficient than 8-bit operations. Therefore, with the XBox 360, a 32-bit local picture ID can be used (in place of a 64-bit picture ID). Such a 32-bit local picture ID only needs to include 8-bits of relevant information (e.g., the upper three bytes of the 32-bit local picture ID are not used).

F. Choice of Invalid Picture ID

The JM reference code sets the invalid picture ID to 0x8000000000000000. In boundary strength computation of the loop filter, a comparison of picture ID with branch is involved. For the 8-bit local picture ID design, the invalid picture ID value is set to 255. This allows the local picture ID to be compared with shifting and logical operations, and in turn speeds up the computation process.

The JM reference code reads as follows:

```
if ( refidx>=0)
    q0 = ref_pic_num[slice_id][list][refidx]
else
    q0 = 0x8000000000000000;
```

When modified to support the 8-bit local picture ID, the code reads as follows: (((refidx)>>(sizeof(RefPicNumType)*8−1))|(ref_pic_num[slice_id][list][refidx])) Where sizeof(RefPicNumType) is 1.

Depending on the number of bits used for the local picture ID (e.g., 5-bit, 16-bit, 32-bit), a similar invalid picture ID can be used. For example, for a 32-bit local picture ID, 0xffffffff can be used.

G. Table Based Remapping for Co-Located Computation

A reference index (ref_idx in H.264) in a slice is an index to a picture in a reference picture list of the slice. In different slices, reference indices with the same value (e.g., 3) may refer to different pictures because the reference picture lists for the different slices can be different. When the decoder retrieves collocated macroblock information for a direct mode macroblock in a B slice, the decoder determines which picture (if any) in the B slice's reference picture list corresponds to the reference picture used for reference by the collocated macroblock that provides the collocated macroblock information.

In co-located computation, the reference pictures used by co-located MBs in co-located pictures need to be mapped to those in list 0 of the current slice. In a specific implementation, a table is used in the remapping procedure as follows.

First all the pictures that are not in list 0 of current slice are initialized.

memset(rgPicIDRefIdxMap, −1, sizeof(char)*256);

Next, the index of the existing reference picture in list 0 of the current slice is stored in the table. Note that duplicate reference pictures are skipped in list 0 of the current slice because the reference picture used by the co-located MB in the co-located picture is mapped to the first matching picture in list 0 of the current slice.

```
for (i=0;i<pSliceHolder->listXsize[LIST_0];i++)
{
    RefPicNumType StorablePicID =
        pSliceHolder->listX[LIST_0][i]->StorablePicID;
    H264_ASSERT(StorablePicID<INVALID_REF_PIC_NUM);
    if (−1==rgPicIDRefIdxMap[StorablePicID])
    {
        rgPicIDRefIdxMap[StorablePicID]= (char)i;
    }
}
```

Using the remapping process, the index in list 0 of the current slice can be retrieved for the reference picture used by the co-located MB directly with the index table above. The remapping process can improve computation efficiency up to 16 or 32 times.

H. Example Local Picture ID Implementation

Figure 3:
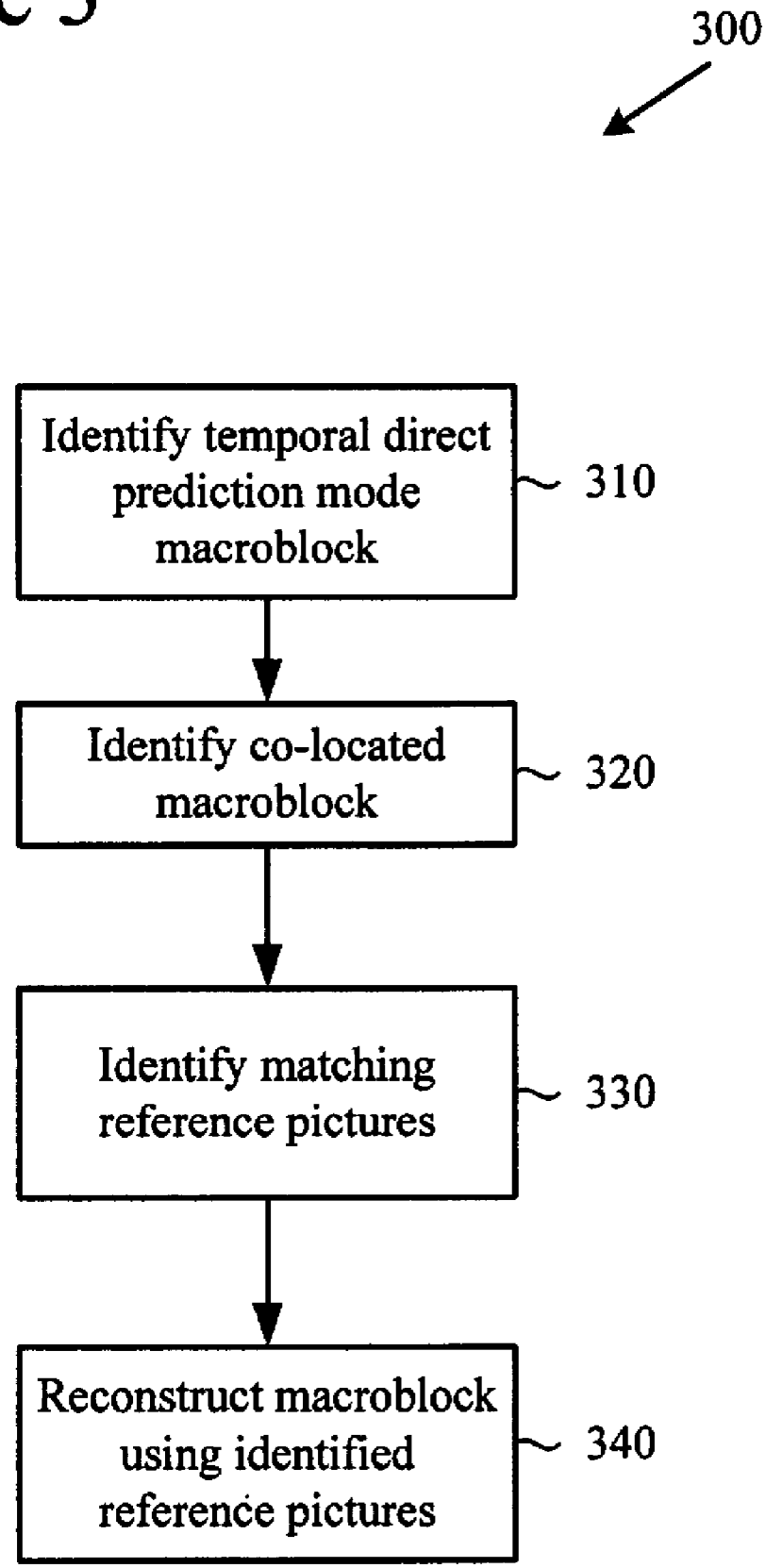
FIG. 3 is a flowchart illustrating an example method for decoding video information using local picture identifiers.

FIG. 3 depicts an example method 300 for decoding video information using local picture identifiers. At 310, a temporal direct prediction mode macroblock is identified. The macroblock is associated with a reference picture list (e.g., reference picture list 0) and the reference pictures of the reference picture list are identified using local picture identifiers (e.g., 8-bit local picture IDs).

At 320, a co-located macroblock of the temporal direct prediction mode macroblock is identified. The co-located macroblock uses one or more reference pictures.

At 330, one or more reference pictures are identified in the reference picture list that match the one or more reference pictures used by the co-located macroblock, where the identifying the one or more reference pictures in the reference picture list uses local picture identifiers.

At 340, the temporal direct prediction mode macroblock is reconstructed using the identified reference pictures.

In the example method 300, the local picture IDs can be, for example, 5-bit local picture IDs, 8-bit local picture IDs, or 32-bit local picture IDs.

In some implementations, a table can be used to identify matching reference pictures (330). For example, a table can be created, where the table stores reference picture list index values for reference pictures in the reference picture list, and where the stored reference picture list index values are indexed in the table by their respective local picture identifiers. Once the table has been created, it can be used in the identification process, where the identification is performed by looking up local picture identifiers of the one or more reference pictures used by the co-located macroblock in the table and retrieving corresponding reference picture list index values, where the retrieved reference picture list index values identify the one or more reference pictures in the reference picture list of the temporal direct prediction mode macroblock that match the one or more reference pictures used by the co-located macroblock.

I. Hardware Acceleration

The local picture ID framework can be implemented with software decoders and hardware accelerated decoders. For example, the local picture ID framework can be implemented with hardware accelerated decoders that support DirectX Video Acceleration (DXVA).

V. Innovations in Computation of Co-Located Information for a Video Decoder

In some embodiments, a decoder uses one or more innovations related to the computation of co-located information when decoding video. Collectively, the computation of co-located information innovations improve computation efficiency (e.g., speed and memory utilization) during video decoding.

A direct mode macroblock uses information from a corresponding macroblock in a collocated picture when determining which motion vectors to apply in motion compensation. The information from the corresponding macroblock is an example of collocated macroblock information. In many encoding scenarios, more than half of the macroblocks in B slices are direct mode macroblocks, and efficient determination of collocated macroblock information is important to performance.

A. Overall Computation Framework

In an H.264/AVC encoded video bitstream, B slices can contain many direct MBs. For direct MBs, there is no MV or Refldx information encoded in the bitstream. The MV and Refldx information is derived from co-located MBs and their spatial neighbors.

When spatial mode is used for direct MBs, the MV and Refldx information is obtained from spatial neighbors with median prediction. However, a check needs to be made to determine whether the co-located MB is moving or not. If the co-located MB is not moving, the MV will be reset to 0. Otherwise, the MV and Refldx information from median prediction is used.

When temporal mode is used for direct MBs, the MV and Refldx information is obtained from co-located MBs. The reference picture used by a co-located MB is found in list 0 of the current slice. This reference picture in list 0 of the current slice is one of the reference pictures for the direct MB. The co-located picture is the other reference picture for the direct MB.

With the setup of MV and Refldx information for direct MBs, the MV and Refldx information needs to be accessed in the co-located picture, and some computation needs to be performed. Various optimizations can be performed depending on the picture type of the co-located picture.

For example, if the co-located picture type is identified as "I picture," then its side information, motion vectors, macroblock type and reference index do not need to be checked. Therefore, information retrieval and checking operations can be eliminated. Similarly, if the co-located picture type is identified as "P picture," then only half of the information and retrieval checking/computation needs to be performed.

B. Definition of Picture Type

There is no picture type in the H.264/AVC specification. In a specific implementation, in order to support the improvements in computation of co-located information, a picture type is defined as follows. When a picture is encountered in PED, its picture type is assigned to one of the below types, as follows:

I picture (bIPicture): all the slices in the picture are I slices,

P picture (bPPicture): all the slices in the picture are I or P slices but not all the slices are I slices, B picture (bBPicture): at least one slice in the picture is B slice.

The type of a picture can only be one of the three types defined above. A picture cannot be assigned more than one type according to the above definition.

Figure 4:
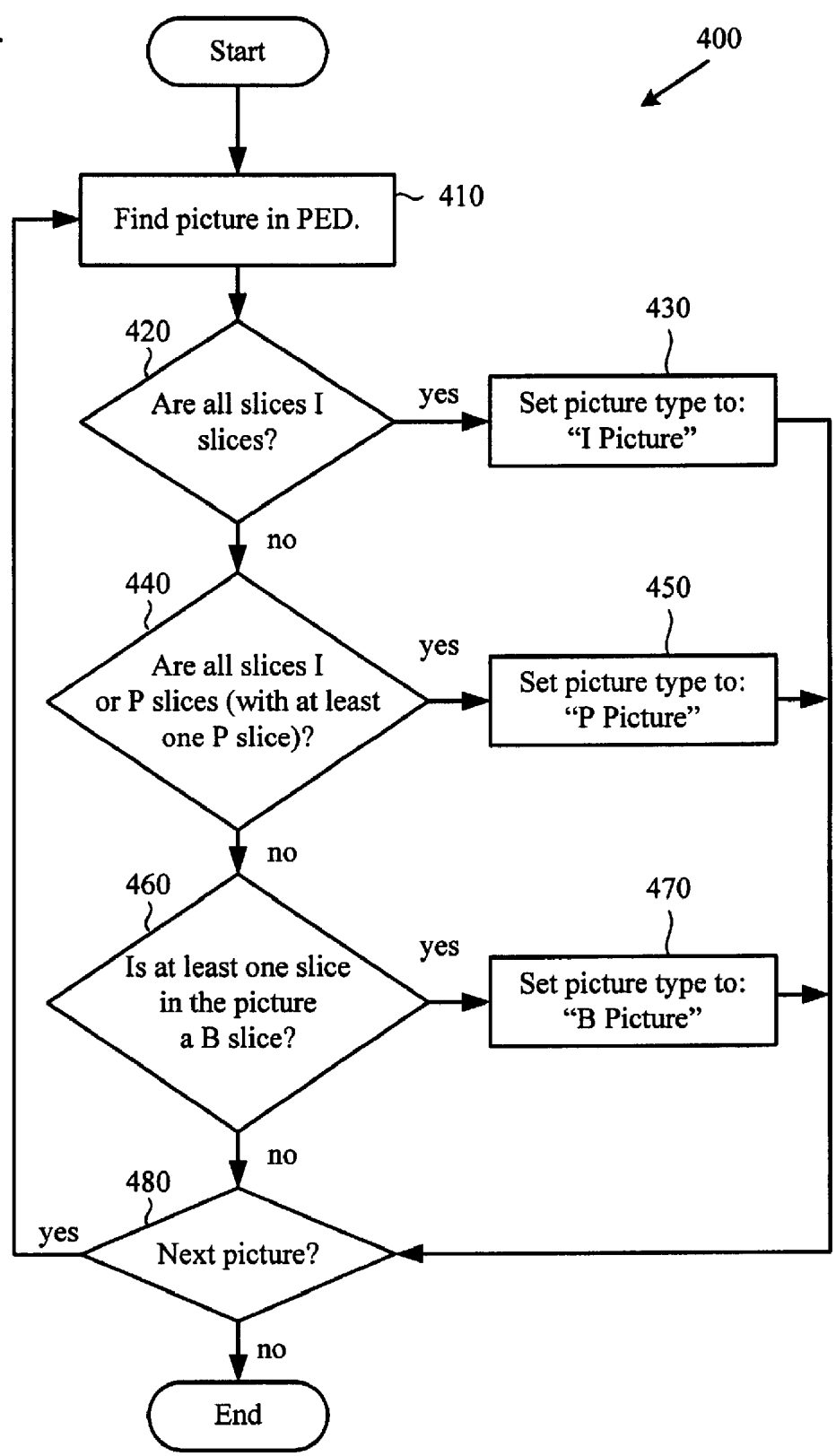
FIG. 4 is a flowchart illustrating an example technique for determining a picture type.

FIG. 4 is a flowchart illustrating an example technique 400 for determining a picture type, using the definition described above. In the flowchart 400, a picture is encountered in PED 410.

At 420, a check is made to determine whether all the slices in the picture are I slices. If yes, the picture type is set to "I Picture" 430. If not, the technique proceeds to 440.

At 440, a check is made to determine whether all the slices in the picture are I or P slices (with at least one P slice). If yes, the picture type is set to "P Picture" 450. If not, the technique proceeds to 460.

At 460, a check is made to determine if at least one slice in the picture is a B slice. If yes, the picture type is set to "B Picture" 470. If not, the technique proceeds to 480. Alternatively, if the determination at 440 is "no," then the picture can be automatically set to "B Picture" 470 because that is the only remaining picture type (i.e., the check at 460 can be skipped).

At 480, a check is made to see if there are any remaining pictures. If so, the next picture is assigned a picture type 410. Otherwise, the technique ends.

C. Computation of Co-Located Information

For 16×16 direct MBs with spatial mode, the following four optimizations regarding computation of co-located information can be performed.

First, when the co-located picture (the co-located picture is the picture containing the co-located macroblock of the direct macroblock to be decoded) is a long term picture, the co-located MB is always treated as "moving". Therefore, there is no need to retrieve any information from the co-located picture. The whole direct MB has the same MV and Refldx. It can be recast into a 16×16 MB.

Second, when the co-located picture is an I picture, the co-located MB is always treated as "moving". Therefore, there is no need to retrieve any information from the co-located picture. The whole direct MB has the same MV and Refldx. It can be recast into a 16×16 MB.

Third, when the co-located picture is a P picture, only the information from list 0 of the co-located picture (not from list 1) needs to be retrieved because list 1 does not exist for a P picture. The computation for "moving" detection has to be done for the information from list 0. A check needs to be made to determine whether the whole direct MB can be recast into a 16×16 MB.

Fourth, when the co-located picture is a B picture, the information from list 0 and list 1 of co-located picture needs to be retrieved. The computation for "moving" detection has to be done for the information from list 0 and list 1. A check needs to be made to determine whether the whole direct MB can be recast into a 16×16 MB.

For 16×16 direct MBs with temporal mode, the following three optimizations regarding computation of co-located information can be performed.

First, when the co-located picture is an I picture, the information coming from the co-located MB is fixed (i.e., all invalid Refldxs). Therefore, there is no need to retrieve any information from the co-located picture. The whole direct MB has the same MV and Refldx (i.e., all 0 MVs and 0 Refldxs). It can be recast into a 16×16 MB.

Second, when the co-located picture is a P picture, only the information from list 0 of co-located picture needs to be retrieved (not from list 1) because list 1 does not exist for a P picture. A check needs to be made to determine whether the whole direct MB can be recast into a 16×16 MB.

Third, when the co-located picture is a B picture, the information from list 0 and list 1 of the co-located picture needs to be retrieved. A check needs to be made to determine whether the whole direct MB can be recast into a 16×16 MB.

A direct MB is a 16×16 block. By default it is treated as 16 4×4 blocks or 4 8×8 blocks with different side information, including motion vectors and reference frames. However, if all the 16 4×4 blocks or 4 8×8 blocks have the same side information, then the block partition (16 4×4 blocks or 4 8×8 blocks) does not matter, and the direct MB can be treated as one 16×16 block. Performing motion compensation and deblocking operations on a whole 16×16 block is more efficient, in typical scenarios, than performing such operations on 16 4×4 blocks or 4 8×8 blocks.

Figure 5:
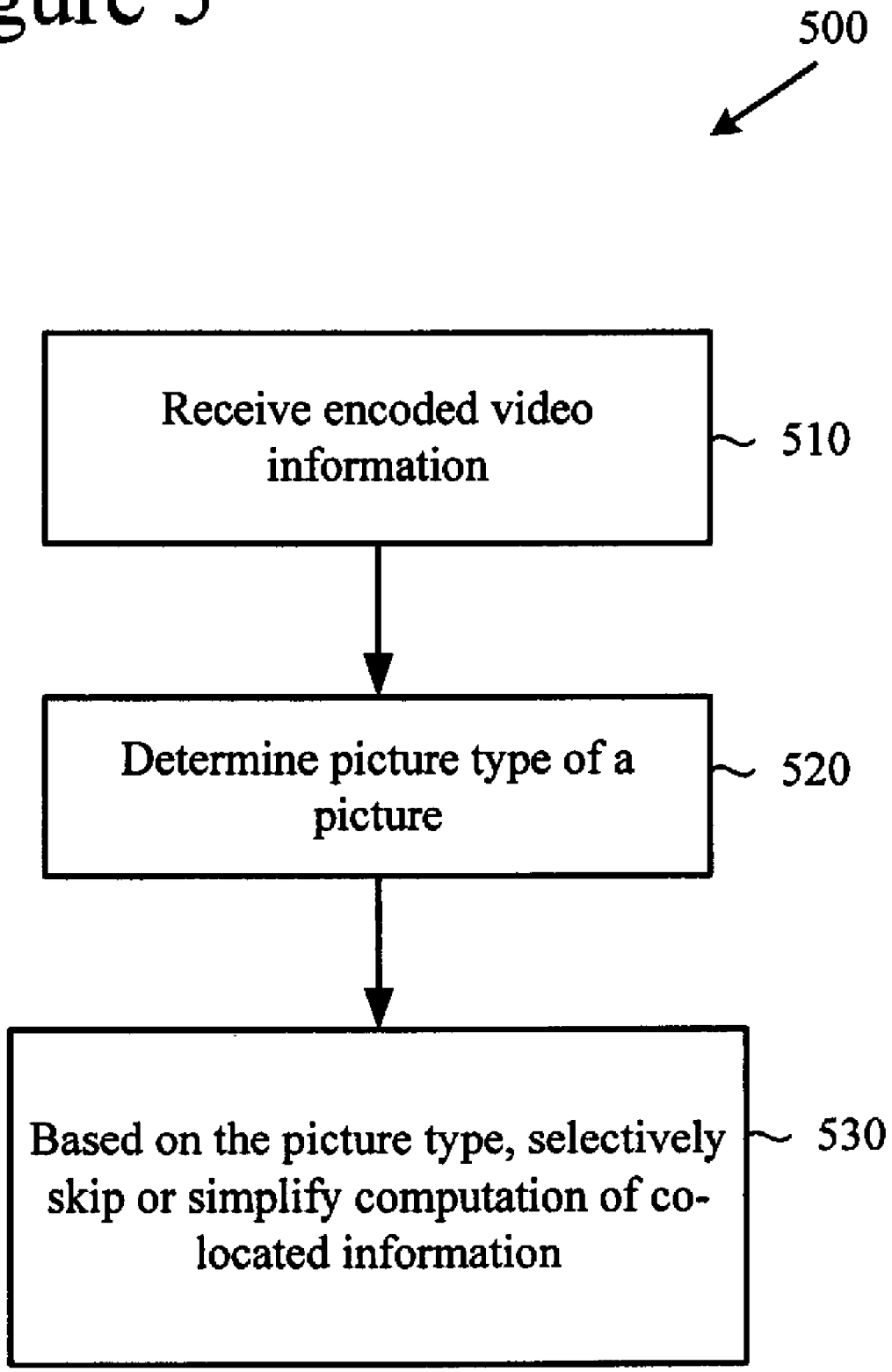
FIG. 5 is a flowchart illustrating an example method for simplifying computation of co-located information during decoding of video information.

FIG. 5 depicts an example method 500 for simplifying computation of co-located information during decoding of video information. At 510, encoded video information is received (e.g., in a bitstream).

At 520, a picture type is determined for a picture based on slice type of one or more slices in the picture. In a specific implementation, the picture is assigned a picture type according to the flowchart depicted in FIG. 4, and as described in Section V(B) above. The picture can be called a "co-located picture" because it may contain a co-located macroblock of a direct prediction macroblock to be decoded.

At 530, based on the picture type of the picture, the decoder selectively skips or simplifies computation of co-located information for use in reconstruction of one or more direct prediction mode macroblocks outside the picture.

A direct prediction mode macroblock is identified. The direct prediction mode macroblock can be a temporal direct prediction mode macroblock or a spatial direct prediction mode macroblock. In a specific implementation, the skipping and simplifications described in Section V(C) above are performed.

Depending on the content and encoding parameters used, the above optimizations can save significant resources during computation of co-located information. For example, experimental results using HD-DVD clips result in a large number of direct MB's in B slices (approximately 50% of the MBs are direct MBs in some situations). In addition, B pictures are not used for reference in HD-DVD clips. With such HD-DVD clips, the above optimizations can reduce the computation of co-location information by approximately half In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A computer-implemented method for transforming encoded video information using a video decoder, the method comprising:
   receiving encoded video information in a bitstream; and
   during decoding the encoded video information, wherein the decoding uses plural reference pictures identified with local picture identifiers:
      identifying a temporal direct prediction mode macroblock, wherein the temporal direct prediction mode macroblock is associated with a reference picture list of one or more of the plural reference pictures;
      identifying a co-located macroblock of the temporal direct prediction mode macroblock, wherein the co-located macroblock uses one or more reference pictures of the plural reference pictures;
      identifying one or more reference pictures in the reference picture list that match the one or more reference pictures used by the co-located macroblock, wherein the identifying the one or more reference pictures in the reference picture list uses local picture identifiers; and
      using the identified one or more reference pictures in reconstruction of the temporal direct prediction mode macroblock;
      wherein the local picture identifiers are assigned to picture structures when allocated, and wherein the decoder reuses the local picture identifiers during the decoding based on availability of the local picture identifiers.

2. The method of claim 1 wherein the local picture identifiers are 8-bit local picture identifiers, and wherein the decoder sets the local picture identifiers independent of picture order count.

3. The method of claim 1 wherein the local picture identifiers are 5-bit local picture identifiers.

4. The method of claim 1 wherein the local picture identifiers are greater than or equal to 5-bits, and less than or equal to 32-bits, and wherein the decoder selectively reuses the local picture identifiers during decoding based on which of the local picture identifiers are in use, thereby controlling bit depth of the local picture identifiers and speeding up the identification of the one or more reference pictures in the reference picture list.

5. The method of claim 1 wherein the temporal direct prediction mode macroblock is in a B slice of the bitstream, and wherein the reference picture list is associated with the B slice.

6. The method of claim 1 further comprising, during decoding the encoded video information:
   creating a table, wherein the table stores reference picture list index values of the reference picture list, and wherein the stored reference picture list index values are indexed in the table by the local picture identifiers;
   wherein the identifying the one or more reference pictures in the reference picture list is performed by looking up one or more local picture identifiers of the one or more reference pictures used by the co-located macroblock in the table and retrieving one or more corresponding reference picture list index values, wherein the retrieved reference picture list index values identify the one or more reference pictures in the reference picture list that match the one or more reference pictures used by the co-located macroblock.

7. The method of claim 1 wherein the local picture identifiers are 8-bit local picture identifiers, and wherein an invalid picture identifier is assigned an 8-bit value of 255.

8. A computing device implementing a video decoder, the computing device comprising:
   a processing unit; and
   memory;
   wherein the computing device is configured to perform operations for decoding video, the operations comprising:
      receiving encoded video information in a bitstream; and
      during decoding the encoded video information, wherein the decoding uses plural reference pictures identified with local picture identifiers:
         identifying a temporal direct prediction mode macroblock, wherein the temporal direct prediction mode macroblock is associated with a reference picture list of one or more of the plural reference pictures;
         identifying a co-located macroblock of the temporal direct prediction mode macroblock, wherein the co-located macroblock uses one or more reference pictures of the plural reference pictures;
         identifying one or more reference pictures in the reference picture list that match the one or more reference pictures used by the co-located macroblock, wherein the identifying the one or more reference pictures in the reference picture list uses local picture identifiers; and
         using the identified one or more reference pictures in reconstruction of the temporal direct prediction mode macroblock;
         wherein the local picture identifiers are assigned to picture structures when allocated, and wherein the decoder reuses the local picture identifiers during the decoding based on availability of the local picture identifiers.

9. The computing device of claim 8 wherein the local picture identifiers are 8-bit local picture identifiers, and wherein the decoder sets the local picture identifiers independent of picture order count.

10. The computing device of claim 8 wherein the local picture identifiers are 5-bit local picture identifiers.

11. The computing device of claim 8 wherein the local picture identifiers are greater than or equal to 5-bits, and less than or equal to 32-bits, and wherein the decoder selectively reuses the local picture identifiers during decoding based on which of the local picture identifiers are in use, thereby controlling bit depth of the local picture identifiers and speeding up the identification of the one or more reference pictures in the reference picture list.

12. The computing device of claim 8 wherein the temporal direct prediction mode macroblock is in a B slice of the bitstream, and wherein the reference picture list is associated with the B slice.

13. The computing device of claim 8, the operations further comprising, during decoding the encoded video information:
creating a table, wherein the table stores reference picture list index values of the reference picture list, and wherein the stored reference picture list index values are indexed in the table by the local picture identifiers;
wherein the identifying the one or more reference pictures in the reference picture list is performed by looking up one or more local picture identifiers of the one or more reference pictures used by the co-located macroblock in the table and retrieving one or more corresponding reference picture list index values, wherein the retrieved reference picture list index values identify the one or more reference pictures in the reference picture list that match the one or more reference pictures used by the co-located macroblock.

14. The computing device of claim 8 wherein the local picture identifiers are 8-bit local picture identifiers, and wherein an invalid picture identifier is assigned an 8-bit value of 255.

15. A computer-readable storage medium storing computer-executable instructions for causing a computer system programmed thereby to perform the method for decoding encoded video information, the method comprising:
receiving encoded video information in a bitstream; and
during decoding the encoded video information, wherein the decoding uses plural reference pictures identified with local picture identifiers:
identifying a temporal direct prediction mode macroblock, wherein the temporal direct prediction mode macroblock is associated with a reference picture list of one or more of the plural reference pictures;
identifying a co-located macroblock of the temporal direct prediction mode macroblock, wherein the co-located macroblock uses one or more reference pictures of the plural reference pictures;
identifying one or more reference pictures in the reference picture list that match the one or more reference pictures used by the co-located macroblock, wherein the identifying the one or more reference pictures in the reference picture list uses local picture identifiers; and
using the identified one or more reference pictures in reconstruction of the temporal direct prediction mode macroblock;
wherein the local picture identifiers are greater than or equal to 5-bits, and less than or equal to 32-bits, and wherein the decoder selectively reuses the local picture identifiers during decoding based on which of the local picture identifiers are in use, thereby controlling bit depth of the local picture identifiers and speeding up the identification of the one or more reference pictures in the reference picture list.

16. The computer-readable storage medium of claim 15 wherein the local picture identifiers are 8-bit local picture identifiers, and wherein the decoder sets the local picture identifiers independent of picture order count.

17. The computer-readable storage medium of claim 15 wherein the local picture identifiers are 5-bit local picture identifiers.

* * * * *